US008032774B2

(12) United States Patent
Yano et al.

(10) Patent No.: US 8,032,774 B2
(45) Date of Patent: Oct. 4, 2011

(54) INFORMATION PROCESSING APPARATUS

(75) Inventors: Kohji Yano, Kanagawa (JP); Eiji Enami, Kanagawa (JP); Naoki Sato, Kanagawa (JP); Yujin Mori, Kanagawa (JP); Noriyuki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 843 days.

(21) Appl. No.: 12/046,748

(22) Filed: Mar. 12, 2008

(65) Prior Publication Data

US 2008/0231878 A1 Sep. 25, 2008

(30) Foreign Application Priority Data

Mar. 19, 2007 (JP) ................................ 2007-071509

(51) Int. Cl.
*G06F 1/00* (2006.01)

(52) U.S. Cl. ........................................ 713/324; 713/320

(58) Field of Classification Search .................. 713/320, 713/323–330
See application file for complete search history.

(56) References Cited

U.S. PATENT DOCUMENTS 6,806,445 B2 10/2004 Satoh
7,122,767 B2 10/2006 Sato et al.
7,127,189 B2 10/2006 Takamatsu et al.
7,164,870 B2 1/2007 Satoh
7,236,714 B2 6/2007 Sato et al.
7,269,368 B2 9/2007 Sato et al.
2004/0117389 A1 6/2004 Enami et al.
2005/0189923 A1 9/2005 Ohishi et al.
2006/0024079 A1 2/2006 Sato et al.
2006/0051119 A1 3/2006 Kishi et al.
2006/0285867 A1 12/2006 Takahashi et al.
2007/0059016 A1 3/2007 Sato et al.
2007/0071479 A1 3/2007 Semma et al.
2007/0098433 A1 5/2007 Yano et al.
2007/0201894 A1 8/2007 Kishi et al.

FOREIGN PATENT DOCUMENTS

JP 2006-195253 7/2006

*Primary Examiner* — Clifford H Knoll
(74) *Attorney, Agent, or Firm* — Oblon, Spivak, McClelland, Maier & Neustadt, L.L.P.

(57) ABSTRACT

When an operation mode of an image forming apparatus returns from an energy-saving mode to a regular operation mode, a CPU of a main system outputs a power control signal set to High, and determines the necessariness of information display on an LCD of an operation unit control system to output a starting mode selection signal set to High when the result of the determination is positive. A CPU of the operation unit control system detects the state of a power control signal, and detects mode return from the energy-saving mode depending on the result of the above detection. The CPU of the operation unit control system also detects the state of a starting mode selection signal, and determines the necessariness of information display on the LCD depending on the result of the detection to carry out a display process depending on the result of the determination.

19 Claims, 15 Drawing Sheets

INFORMATION PROCESSING APPARATUS

CROSS-REFERENCE TO RELATED APPLICATIONS

The present application claims priority to and incorporates by reference the entire contents of Japanese priority document, 2007-071509 filed in Japan on Mar. 19, 2007.

BACKGROUND OF THE INVENTION

1. Field of the Invention

The present invention relates to an information processing apparatus, such as an image forming apparatus with a display device.

2. Description of the Related Art

In recent years, the function of an image forming apparatus such as a multi-function image forming apparatus has advanced remarkably compared to that of a conventional stand-alone copier, etc., which has lead to a great increase in the scale of software installed in the multi-function image forming apparatus. Software greater in scale offers multi-functional capability, but requires a longer time for loading software at the start of the image forming apparatus in proportional to the scale increase. As a result, a time for a user to wait from a point of pressing a start button for starting the image forming apparatus to a point of actual use of the apparatus becomes much longer compared to the conventional stand-alone copier. This poses a problem of impairing user convenience.

A generally adopted solution to this problem is to set a user interface effective before the actual start of the image forming apparatus to reduce an apparent wait time. Specifically, for example, the image forming apparatus carries out control such that a backlight for a display panel (LCD: liquid crystal display) on an operation unit is turned on to output such display as “system is on” when a power supply is started, or such that an image formation command is received actually prior to the start of the apparatus operation. Such control methods reduce a wait time that is bodily sensed by the user.

Depending on a situation, however, display on the display panel may be unnecessary even when the image forming apparatus starts in response to a command from the outside. Reception of a facsimile message late at night is such a case. In this case, an expected job is only the output of received data, so that display on the display panel is considered to be unnecessary. Besides, the image forming apparatus may have a server function of saving image data and exchanging information of the image with an external device via network. This is also a case of no necessity of display, because if the image forming apparatus starts in response to every data access from the outside to turn on the backlight on the operation unit, it may give unnecessary stress to a person who works near the image forming apparatus. To prevent such a situation from happening, effective control may be carried out such that turning on the operation unit at the start of image forming apparatus is allowed in only the minimum necessary starting mode to inhibit display in a starting mode in which display is not required. Quite a few image forming apparatuses, however, does not carry out control over the entire part of the apparatus and control over display operation in an integral manner. This brings difficulty in achieving both objects of execution of display in a short time in a starting mode requiring display and of inhibition of display in a starting mode not requiring display.

A technique has been suggested to achieve above both objects. According to this technique, a dedicated hardware signal for identifying a start factor of an image forming apparatus is exchanged between a system controller controlling the whole operation of the image forming apparatus and an operation unit carrying out display control, and turning on of the operation unit is controlled through this hardware signal (see Japanese Patent Application Laid-Open No. 2006-195253). According to this technique disclosed in Japanese Patent Application Laid-Open No. 2006-195253, when the operation mode returns from an energy-saving mode to a regular operation mode, the operation unit makes a determination on the detail of a return factor causing the mode return from the energy-saving mode as a start factor of the image forming apparatus based on the hardware signal, and turns on a display panel properly to achieve display in a short time and inhibition of unnecessary display.

According to this technique disclosed in Japanese Patent Application Laid-Open No. 2006-195253, however, power supply to the operation unit is cut off in the energy-saving mode and is resumed on mode returning from the energy-saving mode, and the hardware signal is detected when the operation unit starts. Meanwhile, one of the latest versions of image forming apparatuses provides the operation unit with a control function and display data generation function that serve as a means for achieving the operation unit with a higher function and higher display speed to enable display control by the operation unit before the start of the system controller. In such an operation unit, to shorten a return time for mode return from the energy-saving mode, a part of power supply is not cur off even in the energy-saving mode. This operation unit is thus kept being capable of detecting the hardware signal from the system controller at any time. The image forming apparatus equipped with such an operation unit, therefore, is expected to detect the hardware signal in better timing to achieve display in a short time and inhibition of unnecessary display in a more effective manner.

SUMMARY OF THE INVENTION

It is an object of the present invention to at least partially solve the problems in the conventional technology.

According to an aspect of the present invention, an information processing apparatus includes a main system controlling an operation of the information processing apparatus, and a subsystem connected to and communicating with the main system via a communication control line to perform information processing functions. The subsystem includes a first subsystem that controls information display on a display unit. The main system includes a mode changeover unit that, according to a predetermined condition, changes a mode of the information processing apparatus to one of a regular operation mode in which given power is supplied to the main system and the subsystem, and an energy-saving mode in which power lower than power supplied in the regular operation mode is supplied to the main system and the subsystem, a first signal output unit that when the mode changeover unit changes the mode of the information processing apparatus from the energy-saving mode to the regular operation mode, outputs a power control signal indicating the mode changeover of the information processing apparatus, and a second signal output unit that when the mode changeover unit changes the mode of the information processing apparatus from the energy-saving mode to the regular operation mode, determines necessariness of information display on the display unit and outputs a starting mode selection signal indicating a result of the determination. The first subsystem includes an apparatus information obtaining unit that when the mode changeover unit changes the mode of the information processing apparatus from the regular operation mode to the energy-saving mode, obtains apparatus information on the information processing apparatus from the main system, a first signal detecting unit that detects the power control signal output from the first signal output unit, a second signal detecting unit that detects the starting mode selection signal output from the second signal output unit, and a display control unit that controls display of information on the display unit, the information containing the apparatus information obtained by the apparatus information obtaining unit, based on the power control signal detected by the first signal detecting unit and the starting mode selection signal detected by the second signal detecting unit.

According to another aspect of the present invention, an information processing apparatus includes a main system controlling an operation of the information processing apparatus, and a subsystem connected to and communicating with the main system via a communication control line to perform information processing functions. The subsystem includes a first subsystem that controls information display on a display unit. The main system includes a mode changeover unit that, according to a predetermined condition, changes a mode of the information processing apparatus to one of a regular operation mode in which a power control unit supplies given power to the main system and the subsystem, and an energy-saving mode in which the power control unit supplies power lower in potential than power supplied in the regular operation mode to the main system and the subsystem, and a second signal output unit that when the mode changeover unit changes the mode of the information processing apparatus from the energy-saving mode to the regular operation mode, determines necessariness of information display on the display unit and outputs a starting mode selection signal indicating a result of the determination. The first subsystem includes an apparatus information obtaining unit that when the mode changeover unit changes the mode of the information processing apparatus from the regular operation mode to the energy-saving mode, obtains apparatus information on the information processing apparatus from the main system, a power detecting unit that detects a potential of power supplied by the power control unit, a second signal detecting unit that detects the starting mode selection signal output from the second signal output unit, and a display control unit that controls display of information on the display unit, the information containing the apparatus information obtained by the apparatus information obtaining unit, based on the potential detected by the power detecting unit and the starting mode selection signal detected by the second signal detecting unit.

According to still another aspect of the present invention, an information processing apparatus includes a main system controlling an operation of the information processing apparatus, a subsystem connected to and communicating with the main system via a communication control line to perform information processing functions, and a display unit carrying out information display. The subsystem includes a first subsystem that controls information display on the display unit. The main system includes a mode changeover unit that, according to a predetermined condition, changes a mode of the information processing apparatus to one of a regular operation mode in which given power is supplied to the main system and the subsystem, and an energy-saving mode in which power lower than power supplied in the regular operation mode is supplied to the main system and the subsystem, a first signal output unit that when the mode changeover unit changes the mode of the information processing apparatus from the energy-saving mode to the regular operation mode, outputs a power control signal indicating the mode changeover of the information processing apparatus, and a fifth signal output unit that when the mode changeover unit changes the mode of the information processing apparatus from the energy-saving mode to the regular operation mode, determines necessariness of information display on the display unit according to the predetermined condition and outputs a display control signal indicating a result of the determination. The first subsystem includes an apparatus information obtaining unit when the mode changeover unit changes the mode of the information processing apparatus from the regular operation mode to the energy-saving mode, obtains apparatus information on the information processing apparatus from the main system, a first signal detecting unit that detects the power control signal output from the first signal output unit, and a display control unit that transmits display information containing the apparatus information obtained by the apparatus information obtaining unit to the display unit based on the power control signal detected by the first signal detecting unit. The display unit detects the display control signal output from the fifth signal output unit, and selectively carries out or does not carry out information display using the display information transmitted from the display control unit, based on the display control signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information processing apparatus of the present invention will now be described in detail with reference to the accompanying drawings. In describing each of the embodiments, an image forming apparatus is provided as an example of the information processing apparatus.

Figure 1:
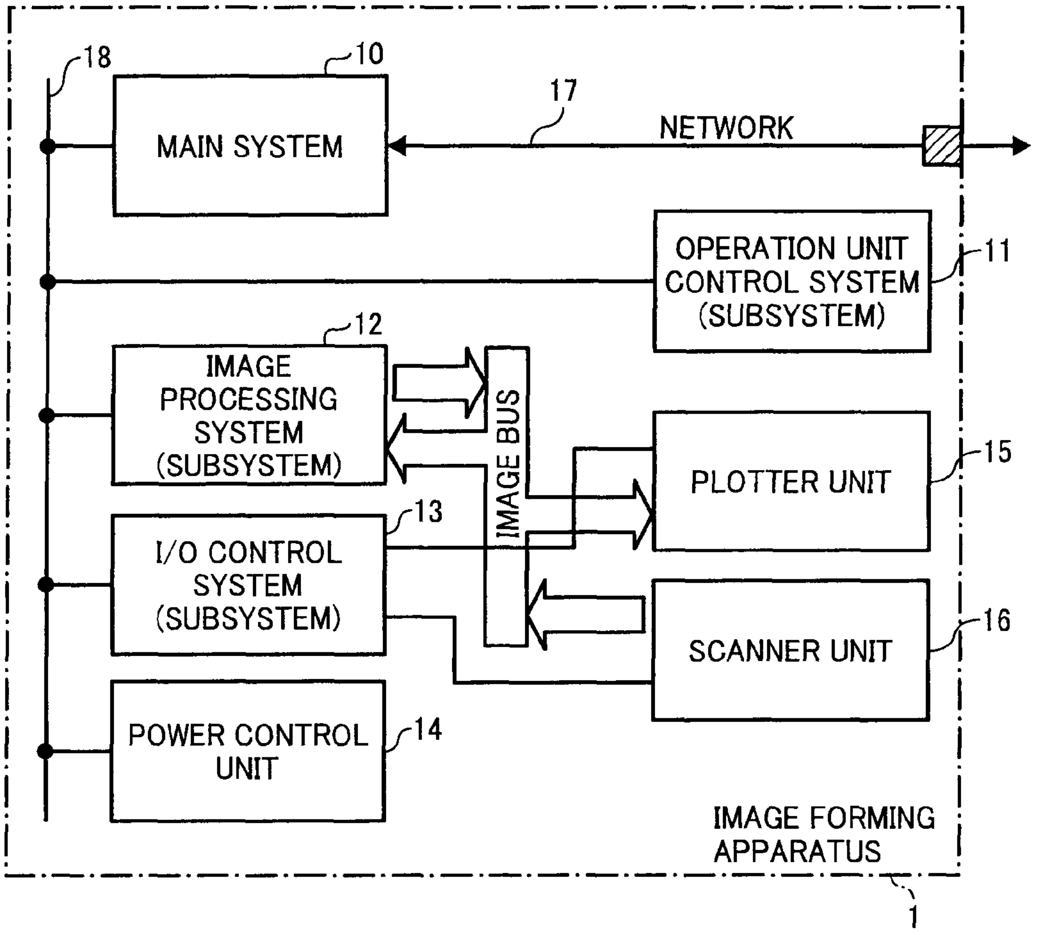
FIG. 1 is a block diagram of the configuration of an image forming apparatus according to a first embodiment of the present invention.

FIG. 1 is a block diagram of the configuration of an image forming apparatus 1 according to a first embodiment of the present invention. The image forming apparatus 1 is composed of a combination of a plurality of units. The units include a main system 10, an operation unit control system 11, an image processing system 12, an I/O control system 13, a power control unit 14, a plotter unit 15, and a scanner unit 16. The main system 10 controls the whole operation of the image forming apparatus 1, and also controls data communication with an external device via a network 17. The scanner unit 16 has an optical system, a scanning mechanism, a motor driving the scanning mechanism (all of which are not shown), etc., scanning a manuscript face to take in image data. The plotter unit 15 exerts a print function through a combination of a plurality of actuators (not shown), such as an image-forming system, fixing system, and paper transfer system. The operation unit control system 11 has an operation input function for a user to input various instructions, and a display function for providing the user with information. The image processing system 12 carries out various processes on image data taken into by the scanner unit 16 and on image data received via the network 17. The I/O control system 13 controls signal input/output to/from the scanner unit 16 and the actuators of the plotter unit 15. The power control unit 14 supplies DC power to each unit. The operation unit control system 11, the image processing system 12, the I/O control system 13, the power control unit 14, the plotter unit 15, and the scanner unit 16 are connected to the main system 10 through a communication control line 18. The main system 10 sends and receives a command properly to and from the operation unit control system 11, the image processing system 12, the I/O control system 13, the power control unit 14, the plotter unit 15, and the scanner unit 16 through the communication control line 18, thus controls each of these units. Each of the operation unit control system 11, the image processing system 12, and the I/O control system 13 is referred to as a subsystem in relation to the main system 10.

Figure 2:
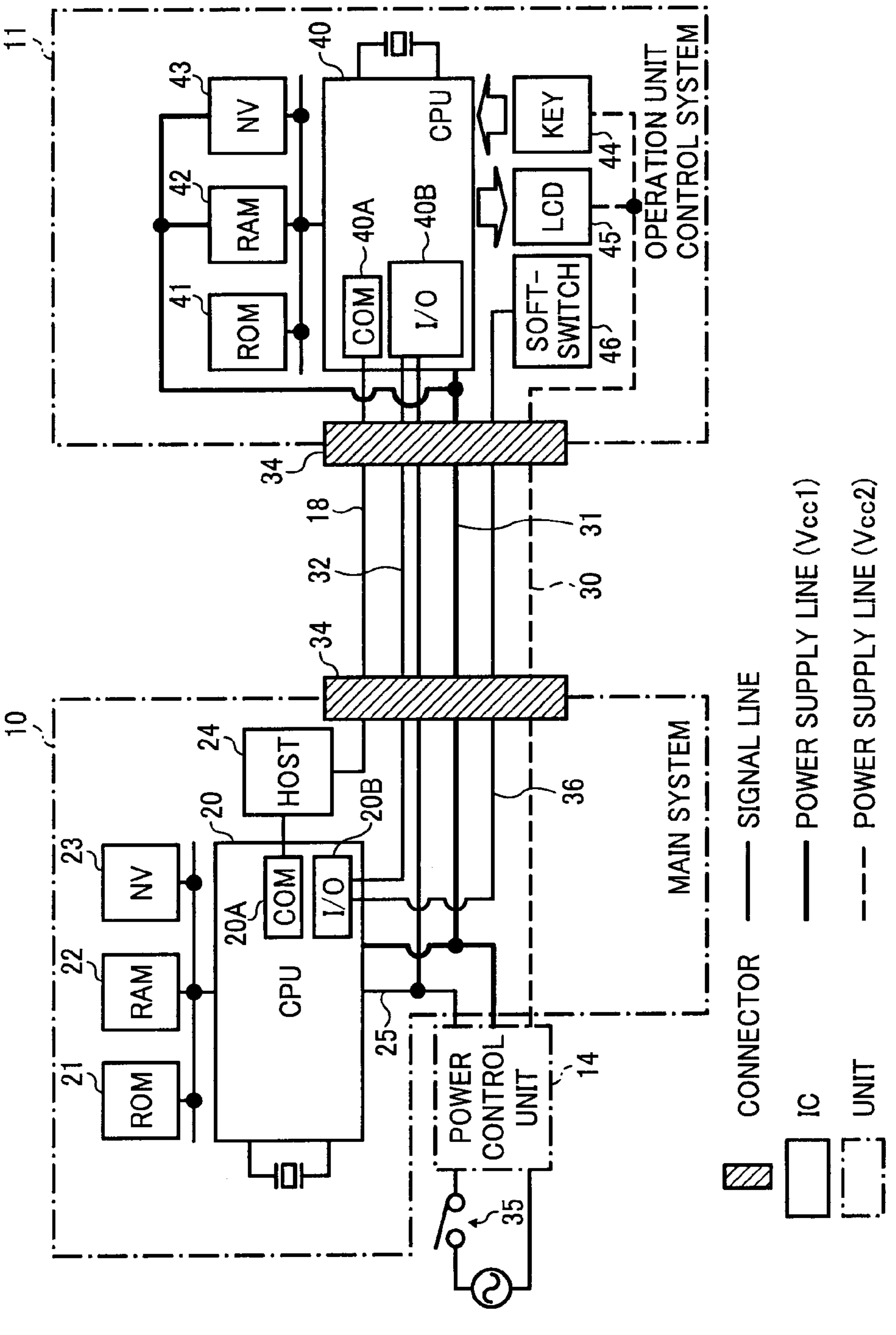
FIG. 2 is a block diagram of the internal configuration of a main system and an operation unit control system according to the first embodiment.

FIG. 2 is a block diagram of the internal configuration of the main system 10 and the operation unit control system 11. The main system 10 and the operation unit control system 11 are connected to each other via connectors 34. The main system 10 includes a central processing unit (CPU) 20, a read only memory (ROM) 21, a random access memory (RAM) 22, a nonvolatile memory (NV) 23, and a host 24. The CPU 20 controls the whole operation of the main system 10, and has a communication unit (COM) 20A and an I/O port 20B to control communication with each subsystem via the communication unit (COM) 20A and the I/O port 20B. The ROM 21 stores thereon various data and programs to be executed by the CPU 20. The RAM 22 temporarily stores thereon various data and programs when the CPU 20 executes the programs. The NV 23 stores thereon various initial values and preset values for the image forming apparatus 1. The host 24 controls communication between the communication unit 20A of the CPU 20 and the operation unit control system 11 via the communication control line 18.

The operation unit control system 11 includes a CPU 40, a ROM 41, a RAM 42, an NV 43, a key input device (KEY) 44, an LCD 45, and a software-switch 46. The CPU 40 controls the whole operation of the operation unit control system 11, and has a communication unit 40A and an I/O port 40B to control communication with the main system via the communication unit 40A and I/O port 40B. The ROM 41 stores thereon various data and programs to be executed by the CPU 40. The RAM 42 temporarily stores thereon various data and programs when the CPU 20 executes the programs. The NV 43 stores thereon various initial values and preset values for the image forming apparatus 1. The NV 43 also stores thereon various programs, such as an LCD module, for displaying information on the LCD 45 and various display data, such as screen data. The KEY 44 and the LCD 45 function as a user interface. The KEY 44 is composed of operation buttons and operation keys for the user to input an instruction. The LCD 45 is a display panel, displaying information for the user to see. The software-switch 46 is operated by the user to control switching on and off in switchover of an energy-saving mode, outputting a switch signal indicating switching on and off in changeover to the energy-saving mode via a signal line 36 in response to the operation by the user. This switch signal is input to the CPU 20 of the main system 10.

The power control unit 14, the CPU 20 of the main system 10, the CPU 40 of the operation unit control system 11, the RAM 42, and the NV 43 are connected to each other via a power supply line (Vcc1) 31. Through the power supply line (Vcc1) 31, power is supplied from the power control unit 14 to the CPU 20 of the main system 10, the CPU 40 of the operation unit control system 11, the RAM 42, and the NV 43. The power control unit 14 is connected to the LCD 45 and the KEY 44 of the operation unit control system 11 via a power supply line (Vcc2) 30. The power control unit 14 is also connected to the CPU 20 of the main system 10 and to the CPU 40 of the operation unit control system 11 via a signal line 25. Through the signal line 25, a power control signal related to starting modes to be described below is output.

Starting modes of the image forming apparatus 1 will then be described. The starting modes of the image forming apparatus 1 include mainly a regular operation mode and an energy-saving mode that are different in power supply state from each other. The regular operation mode is the mode in which the image forming apparatus 1 may receive input of a command or data in a stand-by state of being ready for immediate execution of an image formation process and a process responding to reception of a command or data. The energy-saving mode is the mode in which the image forming apparatus 1 is in a stand-by state of reducing power consumption by the image forming apparatus 1. In the stand-by state in the regular operation mode, every unit is supplied with adequate power. In the energy-saving mode, on the other hand, the minimum number of units for reception of a command or data is supplied with minimum power to reduce power consumption by the image forming apparatus 1. When the operation mode is changed from the regular operation mode to the energy-saving mode, communication through the communication control line 18 is cut off. When the operation mode returns from the energy-saving mode to the regular operation mode, communication through the communication control line 18 is resumed. In the energy-saving mode of the present embodiment, the main system 10 determines changeover to the energy-saving mode based on a given changeover condition and sends an instruction command indicating the changeover to the power control unit 14. In response to the command, the power control unit 14 supplies power to the main system 10 and the operation unit control system 11 only and stops supplying power to other units. Such control allows the main system 10 to wait for a command and, at the same time, reduces power consumption by the image forming apparatus 1.

In this configuration, a switch signal output from the software-switch 46 of the operation unit control system 11 is input to the CPU 20 of the main system 10 via the signal line 36. The CPU 20 detects a change of the switch signal, and, when the switch signal indicates switching on in changeover to the energy-saving mode, turns a power control signal into Low to output the Low power control signal to the power control unit 14 via the signal line 25. When the switch signal indicates switching off in changeover to the energy-saving mode, that is, mode return to the regular operation mode, the CPU 20 turns the power control signal into High to output the High power control signal to the power control unit 14 via the signal line 25. The power control unit 14 then supplies power according to the regular operation mode or the energy-saving mode in response to the power control signal of Low or High. Specifically, in the regular operation mode, the power control unit 14 supplies power through the power supply line (Vcc1) 31 and also through the power supply line (Vcc2) 30. The power control unit 14 supplies power having a potential of a given level or higher through the power supply line (Vcc1) 31, and supplies power having a potential lower than the given level through the power supply line (Vcc2) 30. In the energy-saving mode, on the other hand, the power control unit 14 continues power supply through the power supply line (Vcc1) 31, but cuts off power supply through the power supply line (Vcc2) 30. Hence power supply to units not needed to be activated in the stand-by state is cut off, which reduces power consumption in the stand-by state.

The CPU 20 of the main system 10 is connected to the CPU 40 of the operation unit control system 11 via a signal line 32, through which a starting mode selection signal is output. When the operation mode returns from the energy-saving mode to the regular operation mode, the CPU 20 determines on whether information display on the LCD 45 of the operation unit control system 11 is necessary. When the result of the determination is positive, the CPU 20 turns the starting mode selection signal into High to output the High starting mode selection signal via the signal line 32.

The CPU 40 of the operation unit control system 11 detects the state of a power control signal on the signal line 25, and detects mode return from the energy-saving mode depending on the result of the detection. The CPU 40 also detects the state of a starting mode selection signal on the signal line 32, determines on whether information display on the LCD 45 is necessary depending on the result of the detection, and carries out a display process depending on the result of the determination.

As described above, in the present embodiment, the signal line 32, through which a starting mode selection signal is output, and the signal line 25, through which a power control signal is output, are included in an interface between the main system 10 and the operation unit control system 11.

As shown in FIG. 2, an AC switch 35 is provided for switchover in turning on and off a power supply in the power control unit 14. When the power supply is turned off with the AC switch 35, power supply through the power supply line (Vcc1) 31 is also cut off. A mode set for the image forming apparatus 1 in correspondence to this case is called, for example, shutdown mode, which is the mode for the minimum power consumption among modes set for the image forming apparatus 1. In this shutdown mode, the image forming apparatus 1 cannot be restarted even if input is made by operating the KEY 44, or depressing the software-switch 46, etc. The image forming apparatus 1 in the shutdown mode, therefore, is usually activated when the image forming apparatus 1 changes into the regular operation mode and energy-saving mode.

A basic starting process of the present embodiment will then be described. When the AC switch 35 of the image forming apparatus 1 is switched on, the power control unit 14 supplies power to the main system 10, each of subsystems, the plotter unit 15, and the scanner unit 16. Being supplied with power from the power control unit 14, the CPU 20 of the main system 10 starts operation of initializing the main system 10 according to the program stored on the ROM 21. Meanwhile, when supplied with power from the power control unit 14, the CPU 40 of the operation unit control system 11 starts operation of initializing the operation unit control system 11 according to the program stored on the ROM 41. Upon completing operation of initializing itself, the CPU 40 of the operation unit control system 11 gets into a stand-by state to wait for the start of communication with the main system 10.

The CPU 20 of the main system 10, upon completing operation of initializing itself, executes a communication start procedure to establish communication via the communication control line 18, and transmits a communication command to the operation unit control system 11. When receiving a response to the communication command from the operation unit control system 11 following its start, the CPU 20 transmits various setting information and an operation command to the operation unit control system 11. In this manner, the CPU 20 of the main system 10 carries out start operation in the regular operation mode. Subsequently, the image forming apparatus 1 waits for operation input from the user, data reception via the network 17, etc.

Figure 3:
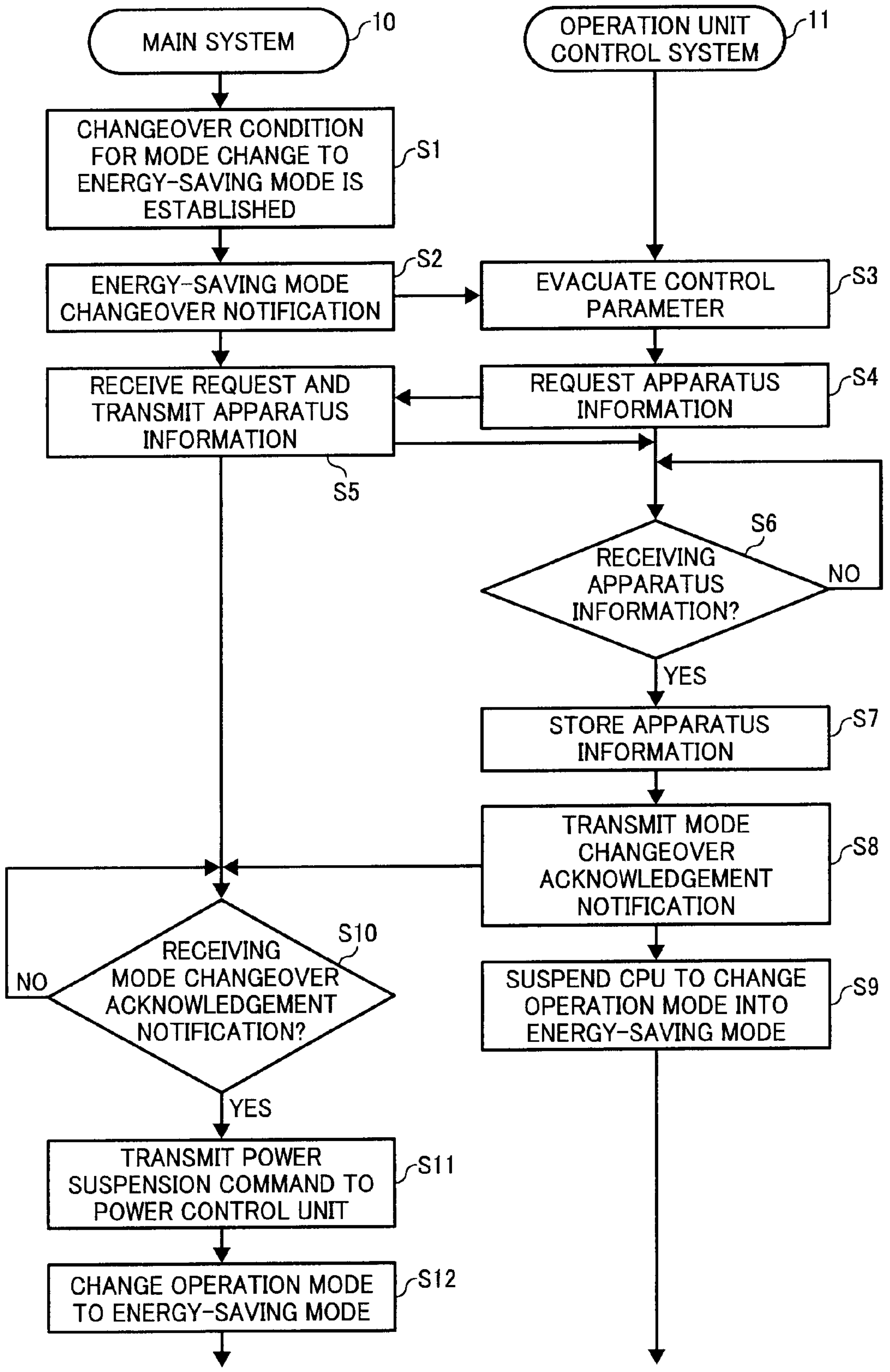
FIG. 3 is a flowchart of a procedure of processes of changeover to an energy-saving mode according to the first embodiment.

A process of changeover from the regular operation mode to the energy-saving mode will then be described. FIG. 3 is a flowchart of a procedure of processes of changeover from the regular operation mode to the energy-saving mode.

After starting in the regular operation mode in the above manner, the image forming apparatus 1 changes its mode over to the energy-saving mode when a given changeover condition is met. Specifically, when the given condition is met (step S1), the CPU 20 of the main system 10 determines changeover to the energy-saving mode, and sends an energy-saving changeover notification indicating the changeover to the energy-saving mode to subsystems (operation unit control system 11, image processing system 12, and I/O control system 13) (step S2). The given changeover condition means, for example, no operation input to the KEY 44 for a predetermined time period, or depressing of the software-switch 46, etc. This given changeover condition is, for example, stored in advance on the ROM 21 of the main system 10. Each subsystem evacuates or stores control parameters retained by the subsystem itself. If any processing is in progress, each subsystem is allowed to withhold transmission of a changeover acknowledgement notification indicating acknowledgment of changeover to the energy-saving mode and reject changeover to the energy-saving mode. Here, operation of the operation unit control system 11, which is one of the subsystems, is described in detail. The CPU 40 of the operation unit control system 11 evacuates or stores control parameters (step S3), and completes execution of all processes to be ready for changeover to the energy-saving mode. At this point in time, the operation unit control system 11 transmits a transfer request for transfer of apparatus information on the state of the image forming apparatus 1 to the CPU 20 of the main system 10 (step S4). Receiving the transfer request, the CPU 20 of the main system 10 transmits the apparatus information retained by the CPU 20 to the operation unit control system 11 according to the request (step S5). The apparatus information is defined as all or a part of various setting values stored on the NV 23, which represent, for example, the number of papers contained in the image forming apparatus 1 and the connection status of peripheral equipment. When receiving the latest apparatus information (YES at step S6), the CPU 40 stores the apparatus information on the RAM 42 (step S7). This apparatus information is used as basic information for generating display data for information display on the LCD 45 when the operation mode returns from the energy-saving mode to the regular operation mode. The apparatus information may be stored on the NV 43. Following the storage of the apparatus information, the CPU 40 transmits a changeover acknowledgment notification to the CPU 20 (step S8), stops operation for communication with the main system 10 through the communication control line 18, and puts the CPU 40 itself into a suspended state to change the operation mode into the energy-saving mode (step S9).

Meanwhile, when the CPU 20 of the main system 10 receives changeover acknowledgement notifications from all subsystems (YES at step S10), the CPU 20 transmits a power suspension command indicating changeover to energy-saving operation to the power control unit 14 (step S11) to change the mode of the image forming apparatus 1 to the energy-saving mode (step S12). This results in cutoff of power supply from the power control unit 14 to the image processing system 12, the I/O control system 13, the plotter unit 15, and the scanner unit 16, and cutoff of power supply to the KEY 44 and the LCD 45 of the operation unit control system 11 via the power supply line (Vcc2) 30. At this time, a power control signal output through the signal line 25 and a starting mode selection signal output through the signal line 32 are kept at the Low level. Power supply via the power supply line (Vcc1) 31, however, is not cut off, which maintains power supply to the RAM 42 of the operation unit control system 11. The apparatus information stored on the RAM 42 at step S7, therefore, is kept intact even in the energy-saving mode.

In the above manner, the image forming apparatus 1 changes its operation mode from the regular operation mode to the energy-saving mode.

Figure 4:
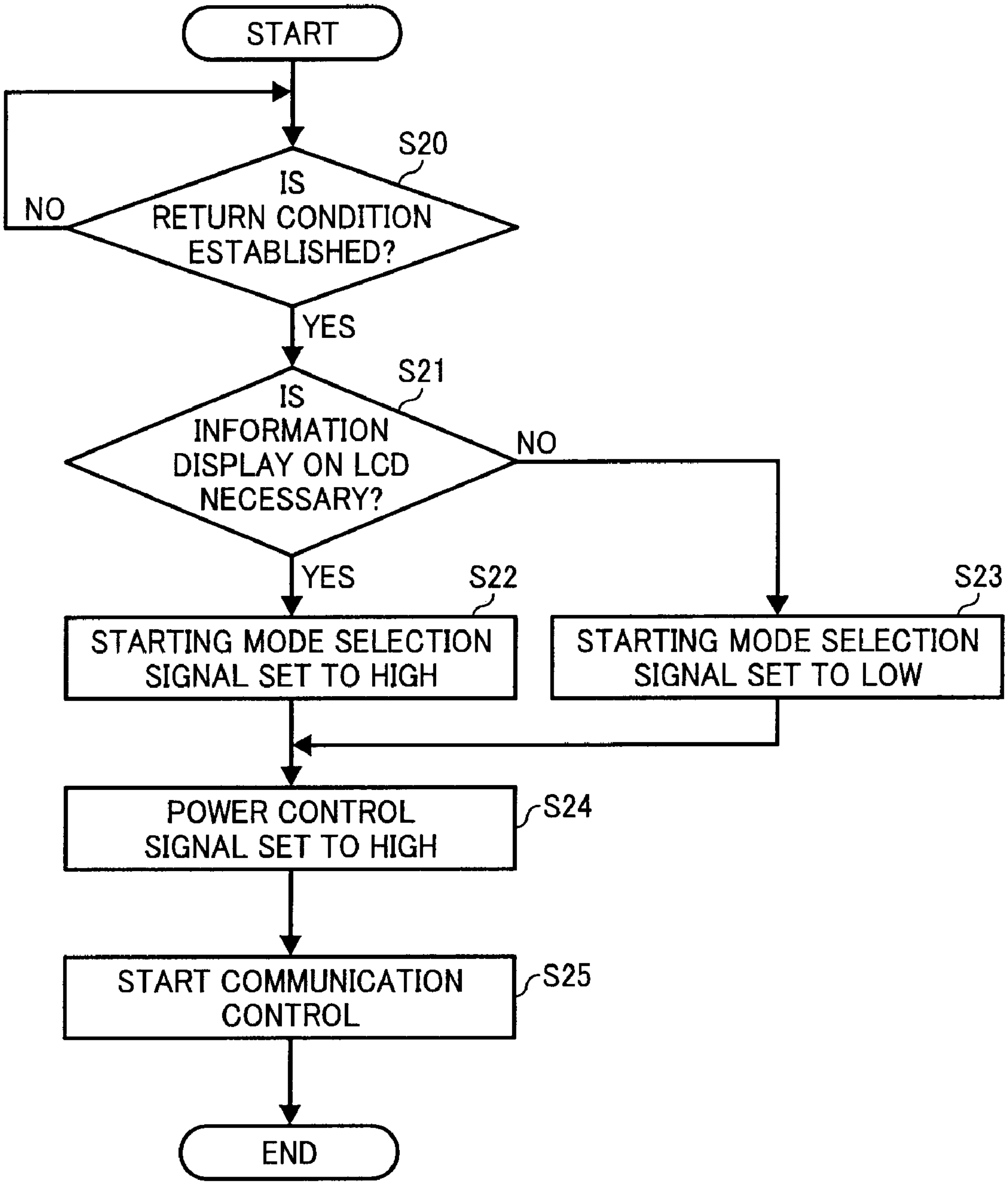
FIG. 4 is a flowchart of a procedure of processes of mode return from the energy-saving mode at the main system according to the first embodiment.

A procedure of processes for the image forming apparatus 1 in the energy-saving mode to execute to return to the regular operation mode will then be described. A procedure of processes at the main system 10 will first be described. FIG. 4 is a flowchart of the procedure of the processes of mode return from the energy-saving mode at the main system 10.

For example, when a given return condition is met (step S20), the CPU 20 of the main system 10 determines return from the energy-saving mode to the regular operation mode. Meeting of the given return condition is concluded in such a case where an energy-saving signal instructing on mode return to the energy-saving mode is output from the software-switch 46 as a result of depressing of the software-switch 46, and is input to the CPU 20 of the main system 10. This given return condition is, for example, stored in advance on the ROM 21 of the main system 10. The given return condition may be met when data is received via the network 17. Following step S20, the CPU 20 determines on whether display of information on the LCD 45 is necessary (step S21), which is determined, for example, based on the given return condition. For example, when the given return condition is met by depression of the software-switch 46, the CPU 20 determines information display on the LCD 45 to be necessary. When the given return condition is met by data reception via the network 17, the CPU 20 determines information display on the LCD 45 to be unnecessary. When the result of the determination at step S21 is positive, the CPU 20 outputs a starting mode selection signal set to High via the signal line 32 (step S22). When the result of the determination at step S21 is negative, the CPU 20 outputs a starting mode selection signal set to Low via the signal line 32 (step S23). The CPU 20 then outputs a power control signal set to High via the signal line 25 (step S24). Subsequently, the CPU 20 starts a communication control process to establish communication with the CPU 40 of the operation unit control system 11 via the host 24 and the communication control line 18.

Figure 5:
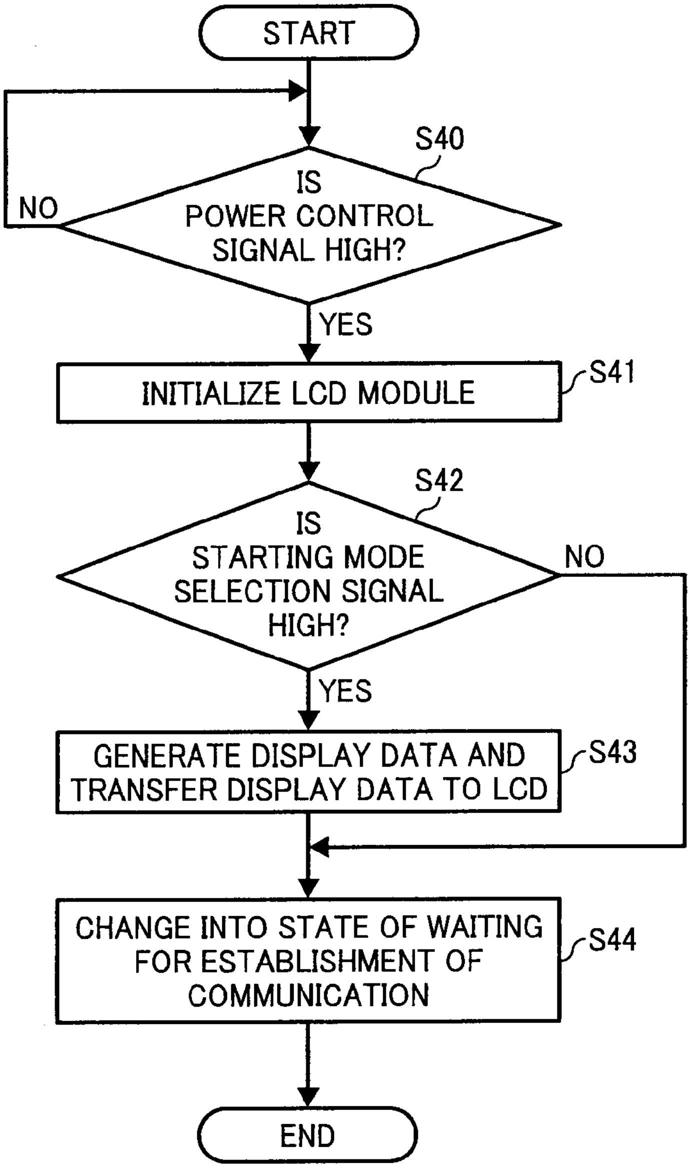
FIG. 5 is a flowchart of a procedure of processes of mode return from the energy-saving mode at the operation unit control system according to the first embodiment.

A procedure of processes of return from the energy-saving mode to the regular operation mode at the operation unit control system 11 will then be described. FIG. 5 is a flowchart of the procedure of processes of mode return from the energy-saving mode at the operation unit control system 11.

In the energy-saving mode, the operation unit control system 11 is cut off from power supply via the power supply line (Vcc2) 30. This stops the LCD 45 and the KEY 44 from functioning.

When detecting a change in the state of a power control signal from Low to High (step S40), the CPU 40 of the operation unit control system 11 initializes an LCD module stored on the NV 43 (step S41). The CPU 40 then detects the state of a starting mode selection signal on the signal line 32 (step S42). When detecting the starting mode selection signal to be High (YES at step S42), the CPU 40 determines execution of information display on the LCD 45. The CPU 40 then reads out the data stored on the ROM 41, the apparatus information stored on the RAM 42, and the various display data stored on the NV 43 to generate display data using the read out data, and transfers the display data to the LCD 45 (step S43), which carries out information display using the received display data. Subsequently, the CPU 40 waits for establishment of communication with the main system 10 via the communication control line 18 (step S44). When the result of the determination is negative at step S42, the CPU 40 determines non-execution of information display on the LCD 45, and the procedure proceeds to step S44.

In the above manner, when the operation mode returns from the energy-saving mode to the regular operation mode, the operation unit control system 11 detects the state of a power control signal and of a starting mode selection signal in timing for each signal, and causes the LCD 45 to display information according to the state of each signal. The apparatus information displayed on the LCD 45 in this process is put in storage in advance by the operation unit control system 11 when the operation mode is changed over to the energy-saving mode. According to this configuration, information can be displayed on the LCD 45 before communication between the main system 10 and the operation unit control system 11 via the communication control line 18 is established to allow the operation unit control system 11 to start command transmission/reception to/from the main system 10. This enables the start of service for the user in a shorter time, and inhibits unnecessary information display on the LCD 45 to reduce consumption power more effectively.

A second embodiment of the image forming apparatus will then be described. The same constituent units as described in the first embodiment will be denoted by the same reference numerals or omitted in the following description.

Figure 6:
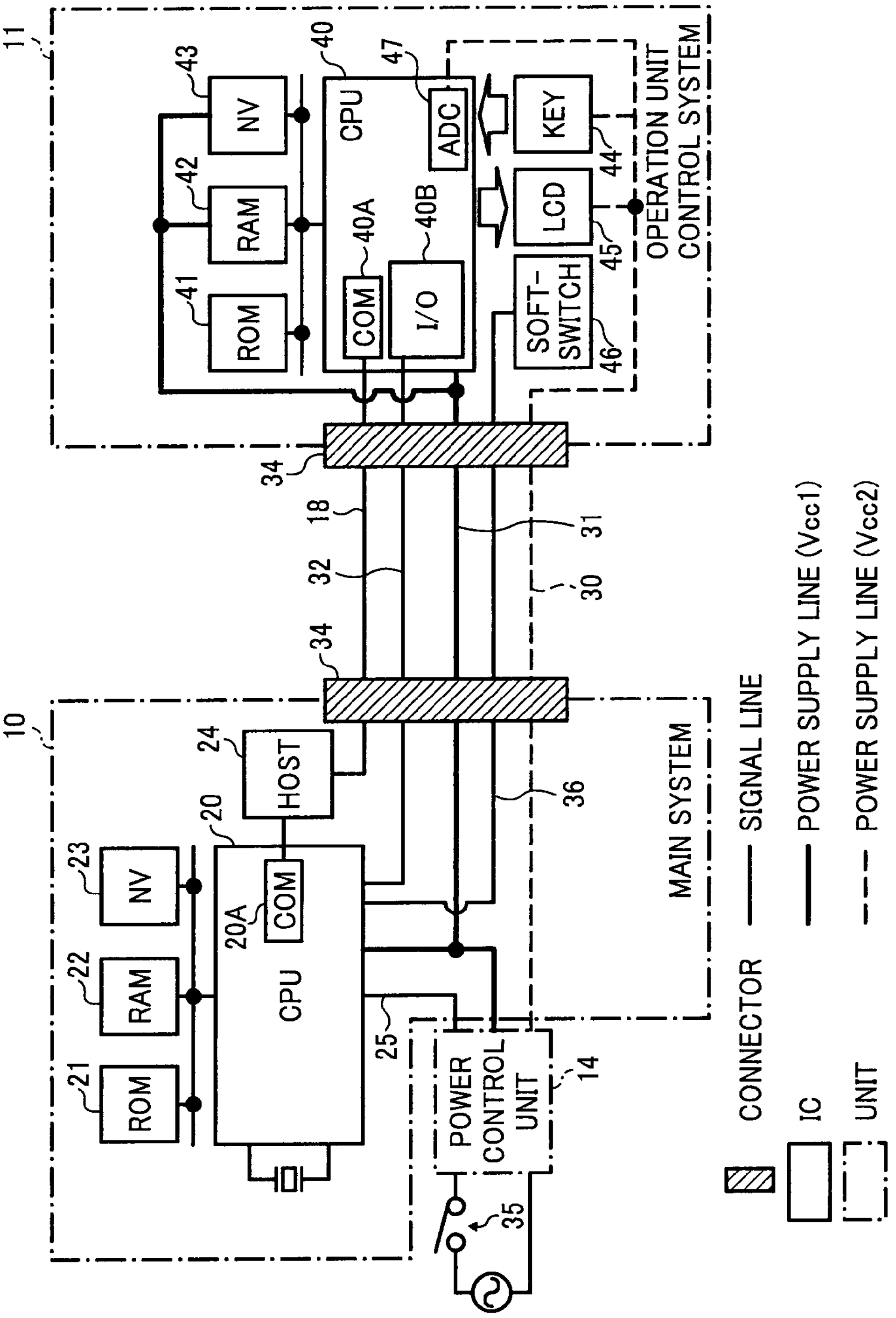
FIG. 6 is a block diagram of the internal configuration of the main system and the operation unit control system according to a second embodiment of the present invention.

FIG. 6 is a block diagram of the internal configuration of the main system 10 and the operation unit control system 11 according to the second embodiment of the present invention. The internal configuration of the main system 10 and the operation unit control system 11 of the present embodiment is different from that of the above first embodiment in the following point. While the operation unit control system 11 detects return from the energy-saving mode to the regular operation mode through a power control signal in the first embodiment, the operation unit control system 11 itself monitors power supplied from the power supply line (Vcc2) 30 to detect return from the energy-saving mode to the regular operation mode in the present embodiment. Since the operation unit control system 11 has to monitor power supplied from the power supply line (Vcc2) 30, the operation unit control system 11 is provided with an ADC (Analog to Digital Converter) 47 for power supply monitoring. The ADC 47 detects the potential of power supplied from the power supply line (Vcc2) 30, and converts the value of the potential (analog value) into a digital value. The CPU 40 determines return from the energy-saving mode to the regular operation mode depending on the potential detected by the ADC 47. The signal line 25 is not connected to the CPU 40 of the operation unit control system 11, which means that a power control signal is not input to the CPU 40. Although the CPU 20 of the main system 10 is not equipped with the I/O port 20B in the present embodiment, the CPU 20 may be equipped with the I/O port 20B as in the first embodiment.

Figure 7:
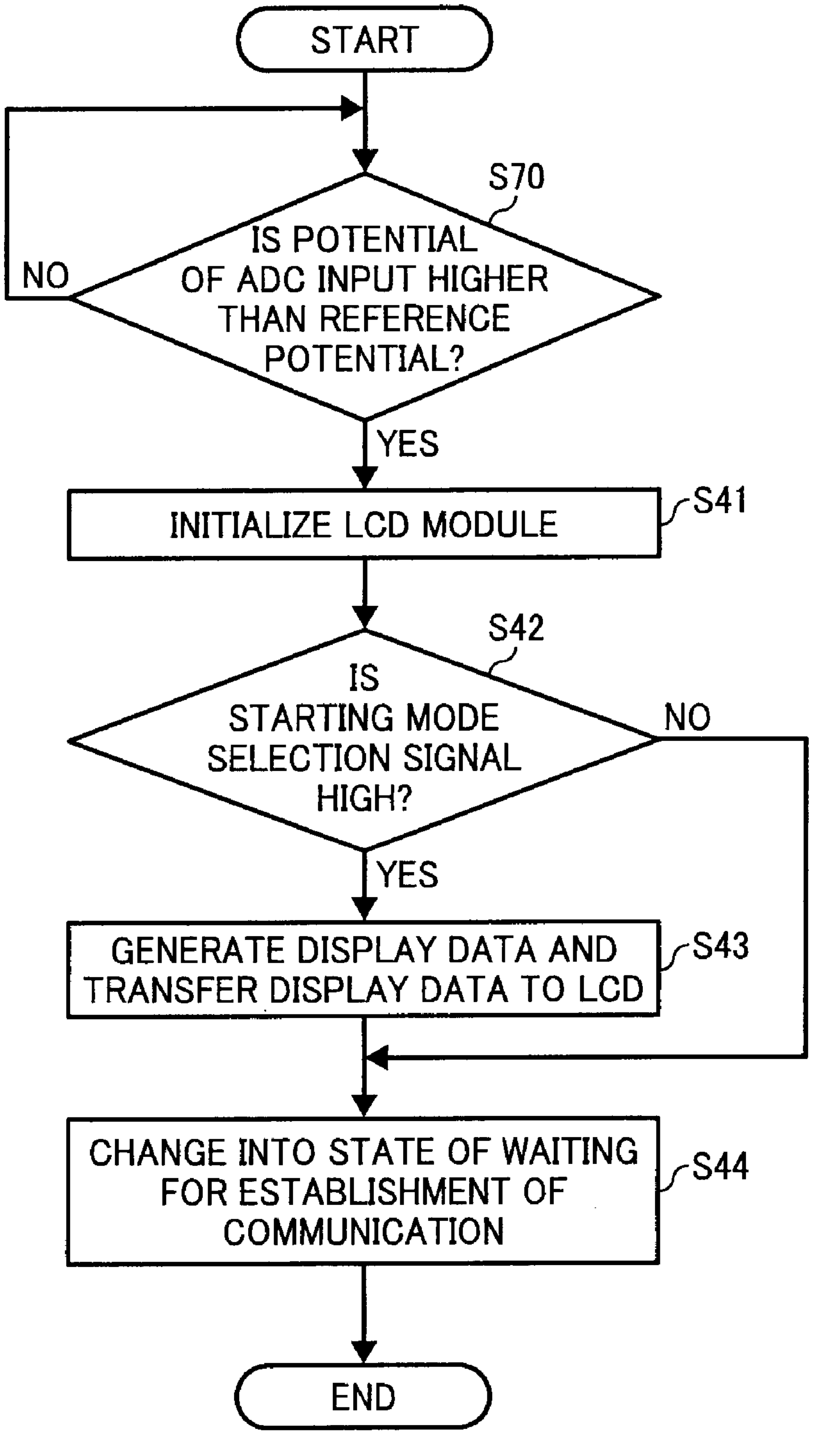
FIG. 7 is a flowchart of a procedure of processes of mode return from the energy-saving mode at the operation unit control system according to the second embodiment.

FIG. 7 is a flowchart of a procedure of processes of mode return from the energy-saving mode at the operation unit control system 11. When the CPU 40 of the operation unit control system 11 detects a potential detected by the ADC 47 to be equal to or higher than a reference potential (step S70), the CPU 40 determines that the operation mode has returned from the energy-saving mode to the regular operation mode, and carries out the process of step S41 described referring to FIG. 5. The processes following step S70 are the same as in the first embodiment.

In the configuration described above, the signal line 25 is not connected to the operation unit control system 11. This reduces the number of signal lines between the main system 10 and the operation unit control system 11, enabling more inexpensive construction of the image forming apparatus.

Another method may be adopted for detecting the potential of power supplied from the power supply line (Vcc2) 30 at the operation unit control system 11. According to the above-mentioned method, the image forming apparatus 1 is provided with a power monitoring IC, which is supplied with power through the power supply line (Vcc2) 30 and outputs a signal, which is then monitored by a general-purpose port.

A third embodiment of the image forming apparatus will then be described. The same constituent units as described in the first embodiment will be denoted by the same reference numerals or omitted in the following description.

In the first embodiment, the CPU 40 of the operation unit control system 11 detects the starting mode selection signal only once at step S42 of FIG. 5. In contrast, according to the present embodiment, the CPU 40 constantly monitors the starting mode selection signal till establishment of communication between the operation unit control system 11 and the main system 10 via the communication control line 18. Constant monitoring of the starting mode selection signal by the CPU 40 brings the following effect. When a plurality of return conditions are met at step S20 of FIG. 4, the CPU 20 of the main system 10 determines on necessariness/unnecessariness of information display on the LCD 45 based on the return conditions, in which case different return conditions may bring different determination results. In this case, the CPU 20 changes the state of the starting mode selection signal to Low or High according to every determination result. The starting mode selection signal, therefore, may possibly change. Because of this, the CPU 40 of the operation unit control system 11 monitors the starting mode selection signal constantly after detecting it once, which allows the CPU 40 to more properly determine on necessariness/unnecessariness of information display on the LCD 45. Once communication between the operation unit control system 11 and the main system 10 via the communication control line 18 is established, however, the CPU 40 becomes capable of communicating with the main system 10 over information display on the LCD 45 via the communication control line 18, which eliminates a need of monitoring of the starting mode selection signal. After establishment of the communication, therefore, the CPU 40 of the operation unit control system 11 stops monitoring the starting mode selection signal.

Figure 8:
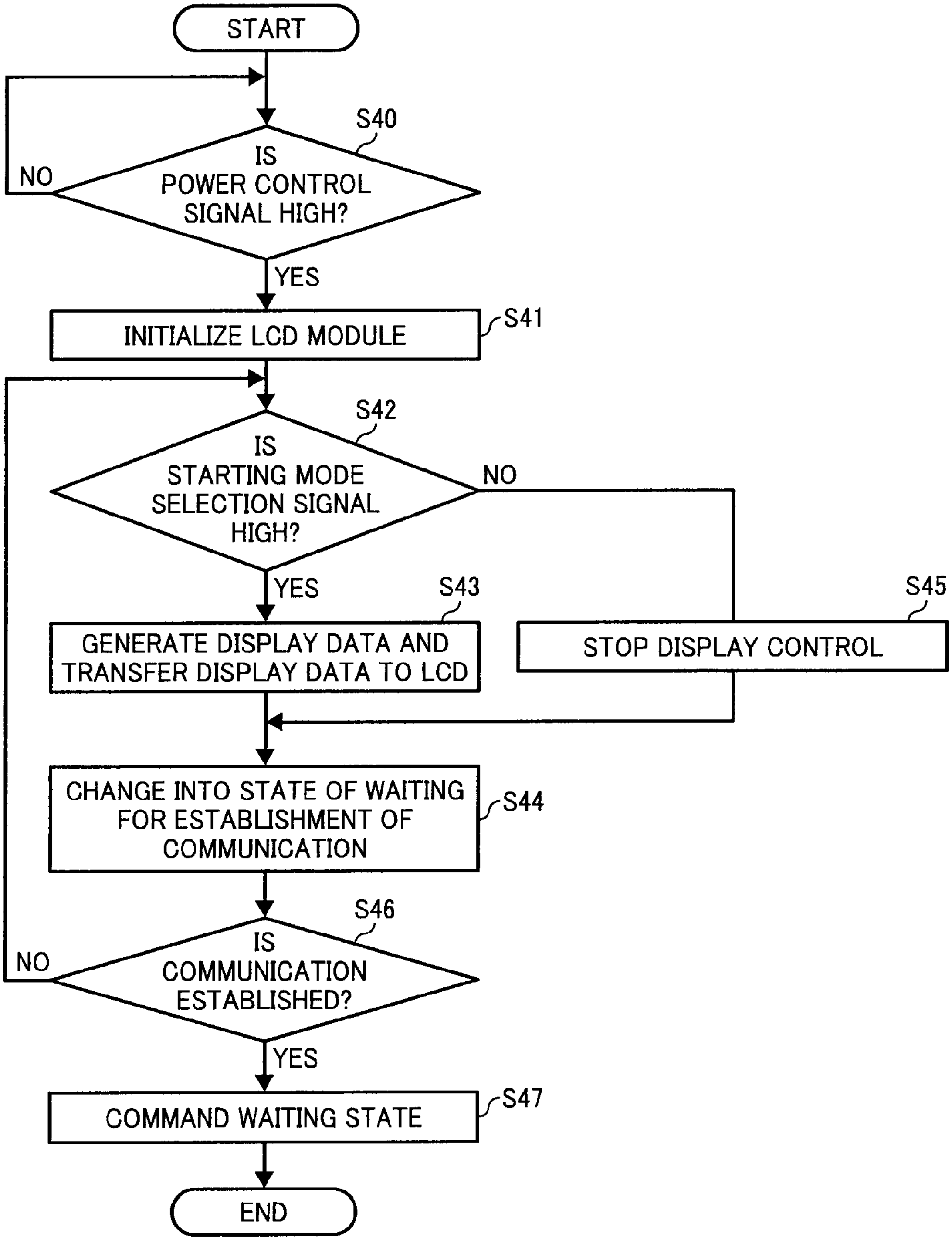
FIG. 8 is a flowchart of a procedure of processes of mode return from the energy-saving mode at the operation unit control system according to a third embodiment of the present invention.

FIG. 8 is a flowchart of a procedure of processes of return from the energy-saving mode to the regular operation mode at the operation unit control system 11 according to the present embodiment. When communication between the operation unit control system 11 and the main system 10 via the communication control line 18 is established following the same steps S40 to S44 as included in the procedure of FIG. 5 (YES at step S46), the CPU 40 of the operation unit control system 11 stops monitoring the starting mode selection signal, and changes into a command waiting state of waiting for a command from the CPU 20 of the main system 10 (step S47).

In the above configuration, information can be displayed more properly in a shorter time on the LCD 45 and unnecessary information display on the LCD 45 can be suppressed more properly. Since the operation unit control system 11 stops monitoring the starting mode selection signal after establishment of communication between the operation unit control system 11 and the main system 10 via the communication control line 18, process load on the operation unit control system 11 is reduced. This enables achievement of faster display control and faster command response after establishment of communication, thus offers the user improved convenience.

A fourth embodiment of the image forming apparatus will then be described. The same constituent units as described in the first embodiment and the third embodiment will be denoted by the same reference numerals or omitted in the following description.

Figure 9:
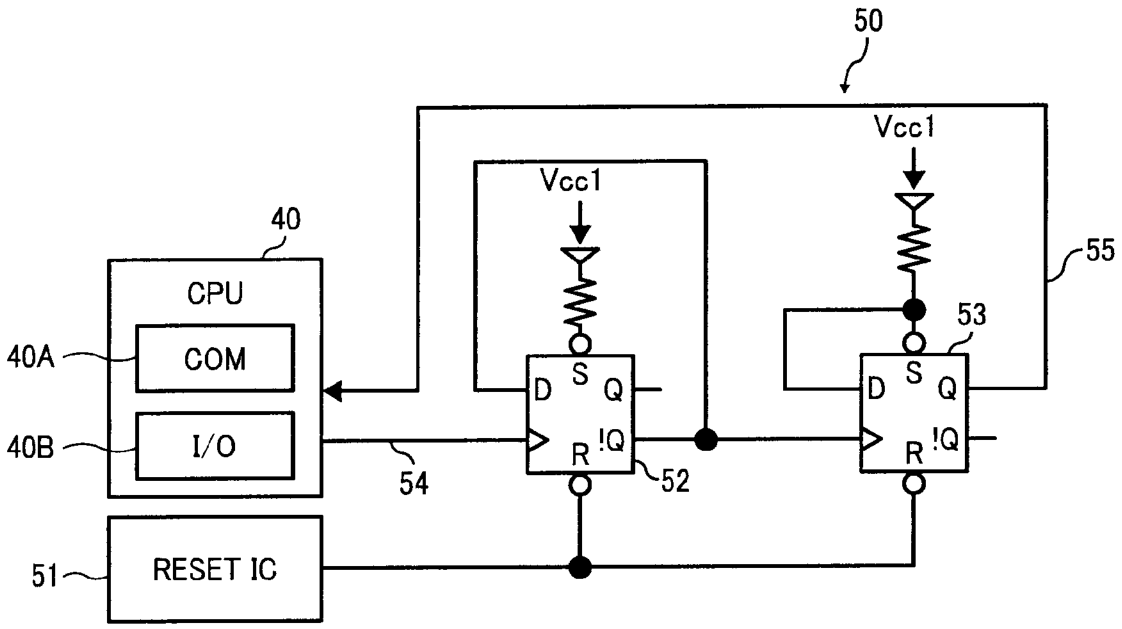
FIG. 9 depicts an example of the configuration of a cutoff detection circuit according to a fourth embodiment of the present invention.

In the present embodiment, the operation unit control system 11 determines necessity of information display on the LCD 45 when the operation mode returns from the energy-saving mode to the regular operation mode. The operation unit control system 11 further determines on the presence/absence of a possibility of a change in the state of the image forming apparatus 1, and carries out information display on the LCD 45 according to the result of the above determination. The operation unit control system 11 is provided with a cutoff detection circuit 50 in a configuration for determining on the presence/absence of a change in the state of the image forming apparatus 1. FIG. 9 depicts an example of the configuration of the cutoff detection circuit 50. The cutoff detection circuit 50 of FIG. 9 includes a reset IC 51, a flip-flop circuit 52, and a flip-flop circuit 53. The cutoff detection circuit 50 is connected to the I/O port 40B of the CPU 40. When the cutoff detection circuit 50 is supplied with power having a potential higher than a predetermined potential from the power supply line (Vcc1) 31, the reset IC 51 resets the flip-flop circuits 52 and 53, which causes the flip-flop circuit 53 to output an equipment status signal set to Low via a signal line 55. Following power supply to the cutoff detection circuit 50, a set signal output from the I/O port 40B of the CPU 40 via a signal line 54 is changed in state from Low to High, High to Low, and Low to High, which sets the flip-flop circuit 53 to High, thus changes the state of the equipment status signal output from the flip-flop circuit 53 via the signal line 55 to High. Afterward, the equipment status signal is kept High unless power supply from the power supply line (Vcc1) 31 is cut off. The CPU 40, therefore, can detect cutoff of power supply from the power supply line (Vcc1) 31 through this equipment status signal.

Cutoff of power supply from the power supply line (Vcc1) 31 happens when the user operates the AC switch 35 to turn off the power supply. An apparatus status signal thus becomes Low in this case, and always becomes High in other cases. Whether power supply from the power supply line (Vcc1) 31 is cut off is detected for the following reason. A case of cutoff of power supply from the power supply line (Vcc1) 31 is, for example, such a case where components of the image forming apparatus 1 are replaced, removed, or newly added, in which case apparatus information of the image forming apparatus 1 may possibly be changed. Specifically, in this case, the apparatus information that the CPU 40 of the operation unit control system 11 receives from the CPU 20 at step S6 of FIG. 3 may possibly be different from the apparatus information obtained at the time of return from the energy-saving mode to the regular operation mode. If information is displayed on the LCD 45 at step S43 of FIG. 5 by using display data generated out of the above apparatus information that may possibly be different from the apparatus information at the time of mode return from the energy-saving mode, imprecise information may be given to the user. In the present embodiment, therefore, the presence/absence of a possibility of a change in apparatus information is determined based on the result of detection of whether power from the power supply line (Vcc1) 31 is cut off, and the above equipment status signal is used for making this determination. When determining that the possibility of a change in apparatus information is present based on the apparatus status signal, the CPU 40 of the operation unit control system 11 displays information on the LCD 45 without using the apparatus information that is stored on the RAM 42 at step S7 of FIG. 3.

Figure 10:
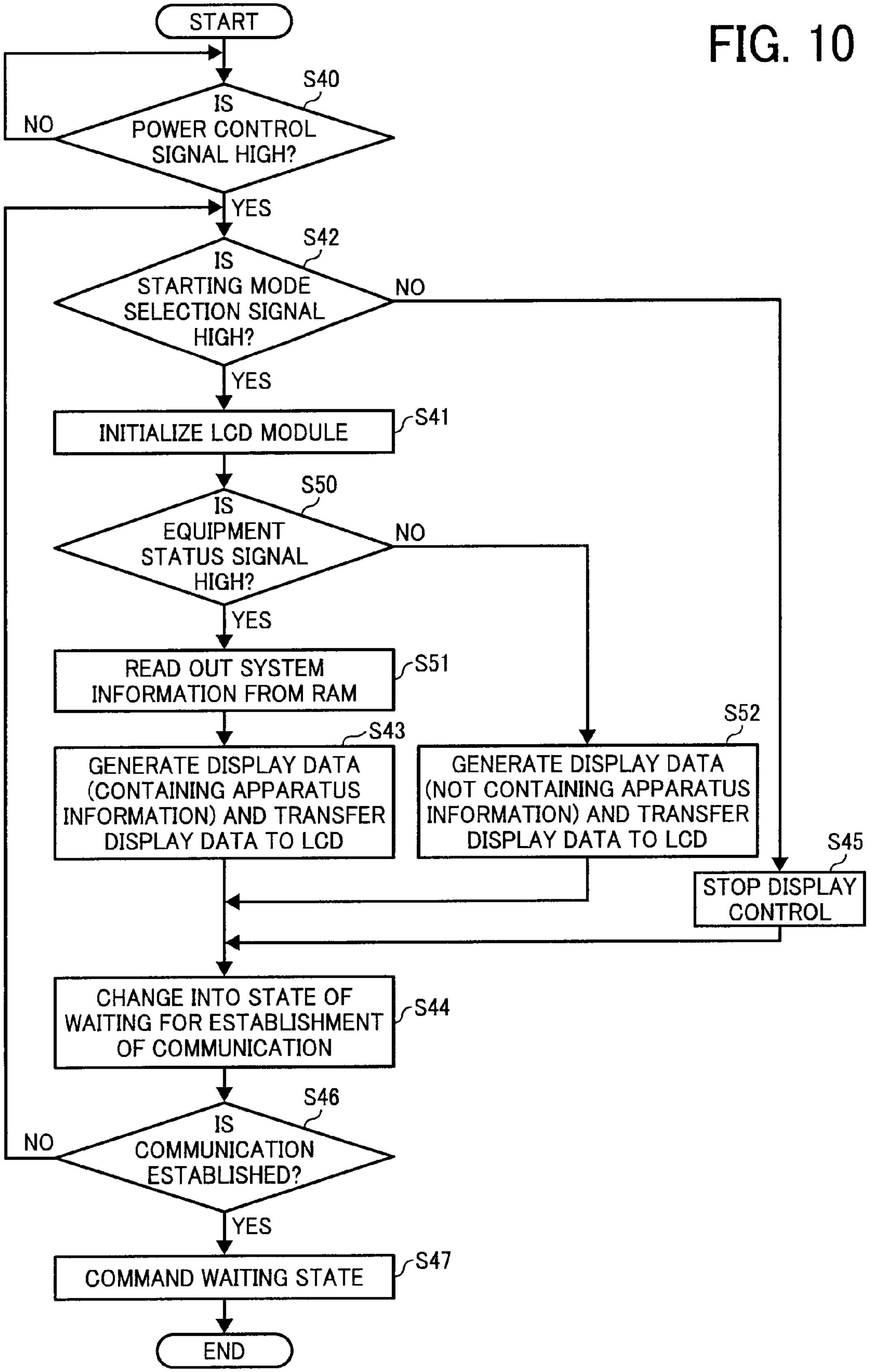
FIG. 10 is a flowchart of a procedure of processes of mode return from the energy-saving mode at the operation unit control system according to the fourth embodiment.

A procedure of processes of mode return from the energy-saving mode at the operation unit control system 11 of the present embodiment will then be described. FIG. 10 is a flowchart of the procedure of processes of mode return from the energy-saving mode at the operation unit control system 11.

When the CPU 40 of the operation unit control system 11 detects a change in the state of a power control signal on the signal line 25 from Low to High (step S40), the CPU 40 then detects the state of a starting mode selection signal on the signal line 32 (step S42). When detecting the starting mode selection signal to be High (YES at step S42), the CPU 40 determines execution of information display on the LCD 45, and initializes the LCD module stored on the NV 43 (step S41). The CPU 40 then detects the state of an equipment status signal on the cutoff detection circuit 50 (step S50). When the equipment status signal is High (YES at step S50), the CPU 40 determines that a possibility of a change in the state of the image forming apparatus 1 is not present. The CPU 40 thus reads out the data stored on the ROM 41, the apparatus information stored on the RAM 42, and the various display data stored on the NV 43 (step S51), generates display data using the read out data, and transfers the display data to the LCD 45 (step S43), which displays information using the display data.

When the equipment status signal is Low (NO at step S50), the CPU 40 determines that the possibility of a change in the state of the image forming apparatus 1 is present. The CPU 40 thus reads out the data stored on the ROM 41 and the various display data stored on the NV 43, generates display data using the read out data, and transfers the display data to the LCD 45 (step S52), which displays information using the display data. In this case, therefore, the CPU 40 generates the display data without using the apparatus information stored on the RAM 42. Hence no apparatus information is displayed on the LCD 45.

Each of step S43 and step S52 is followed by step S44. Steps to ensue after step S44 are the same as steps shown in FIG. 8, and, therefore, are not described further. The same procedure is also taken following step S44 when a determination result at step S42 is negative.

According to the above configuration, the operation unit control system 11 can display information on the LCD 45 in a shorter time, and inhibit unnecessary information display on the LCD 45. When the possibility of a change in the state of the image forming apparatus 1 is present, the operation unit control system 11 does not allow the LCD 45 to display apparatus information to prevent offering of inaccurate information. In this case, the operation unit control system 11 may obtain the latest apparatus information via the communication control line 18 after establishment of communication between the operation unit control system 11 and the main system 10 via the communication control line 18. In such a case, for example, the main system 10 updates apparatus information at the point in time of change of the state of the image forming apparatus 1 and sends the updated apparatus information to the operation unit control system 11. Or, the operation unit control system 11 may request the main system 10 to send the latest apparatus information to the operation unit control system 11. In this manner, the user is constantly provided with accurate information.

A fifth embodiment of the image forming apparatus will then be described. The same constituent units as described in the first embodiment will be denoted by the same reference numerals or omitted in the following description.

Figure 11:
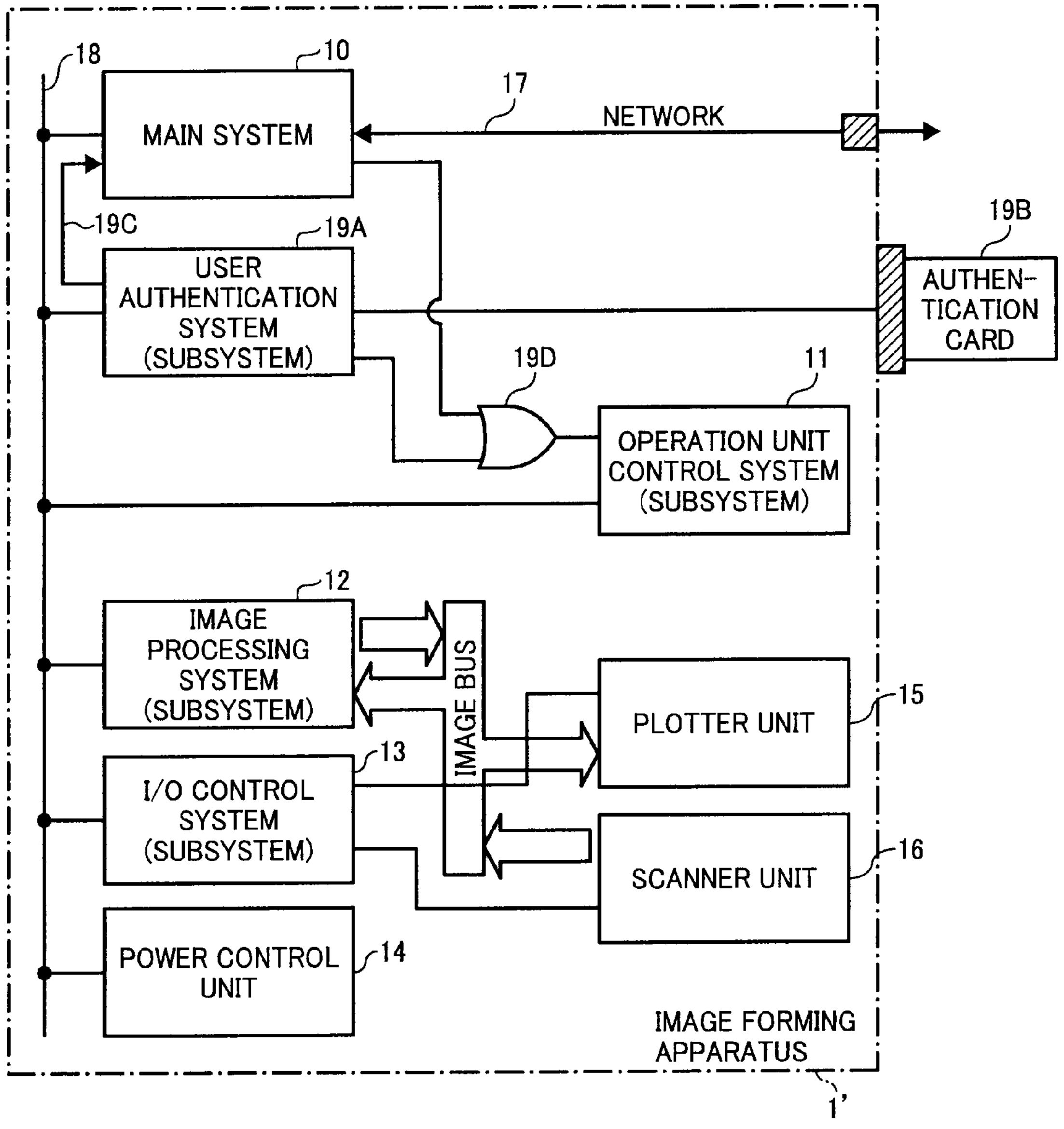
FIG. 11 is a block diagram of the configuration of an image forming apparatus according to a fifth embodiment of the present invention.

FIG. 11 is a block diagram of the configuration of an image forming apparatus 1' according to the present embodiment. The image forming apparatus 1' includes a user authentication system 19A as a subsystem, which is connected to the main system 10 via a communication line 19C. A logic circuit 19D is provided between the operation unit control system 11 and the main system 10 and user authentication system 19A. The image forming apparatus 1' also includes a card slot and a card reader (not shown). When an authentication card 19B is inserted in the card slot, the user authentication system 19A outputs a starting signal to the main system 10 via the communication line 19C. This starting signal serves as a request for starting of the image forming apparatus 1. Upon detecting the starting signal, the main system 10 transmits and receives a command to and from the user authentication system 19A via the communication line 19C. According to a received command from the main system 10, the user authentication system 19A reads out information stored on the authentication card 19B through the card reader, and transmits the read information to the main system 10. As a result, the main system 10 becomes capable of user authentication using the received information.

In addition to output of the starting signal, the user authentication system 19A outputs a starting mode selection signal set at High via the logic circuit 19D to cause the LCD 45 to display a user authentication screen, etc. Meanwhile, the main system 10 also outputs a starting mode selection signal set at High when determining information display on the LCD 45 to be necessary at the time of return from the energy-saving mode to the regular operation mode in the same manner as in the first embodiment. This starting mode selection signal output from the main system 10 goes through the logic circuit 19D, which outputs a signal obtained as the logical OR of both starting mode selection signals to the operation unit control system 11. As a result, for example, even when the starting mode selection signal output from the main system 10 is Low, if the starting mode selection signal output from the user authentication system 19A is High, the High starting mode selection signal is output to the operation unit control system 11. At step S22 of FIG. 4, the CPU 40 of the operation unit control system 11 detects the starting mode selection signal in the same manner as described in the first embodiment, and determines on the necessariness/unnecessariness of information display on the LCD 45 based on the starting mode selection signal.

As described above, when the main system 10 is started by such a subsystem as the user authentication system 19A, the subsystem outputs the starting mode selection signal to the operation unit control system 11. This allows the operation unit control system 11 to start information display on the LCD 45 more quickly than in a conventional case where communication between the main system 10 and the subsystem is established following the start of the main system 10, and then the operation unit control system 11 is notified of the start of the main system 10 by the subsystem and a command is sent to the operation unit control system 11 to instruct it to display information on the LCD 45. This improves convenience for the user.

A sixth embodiment of the image forming apparatus will then be described. The same constituent units as described in the fifth embodiment will be denoted by the same reference numerals or omitted in the following description.

The description of the fifth embodiment relates to the configuration in which a starting mode selection signal is output from a subsystem other than the main system 10. In this configuration, the state of the starting mode selection signal detected by the CPU 40 of the operation unit control system 11 may change from Low to High. For this reason, in the present embodiment, the CPU 40 constantly monitors the starting mode selection signal even after establishment of communication between the operation unit control system 11 and the main system 10 via the communication control line 18.

Figure 12:
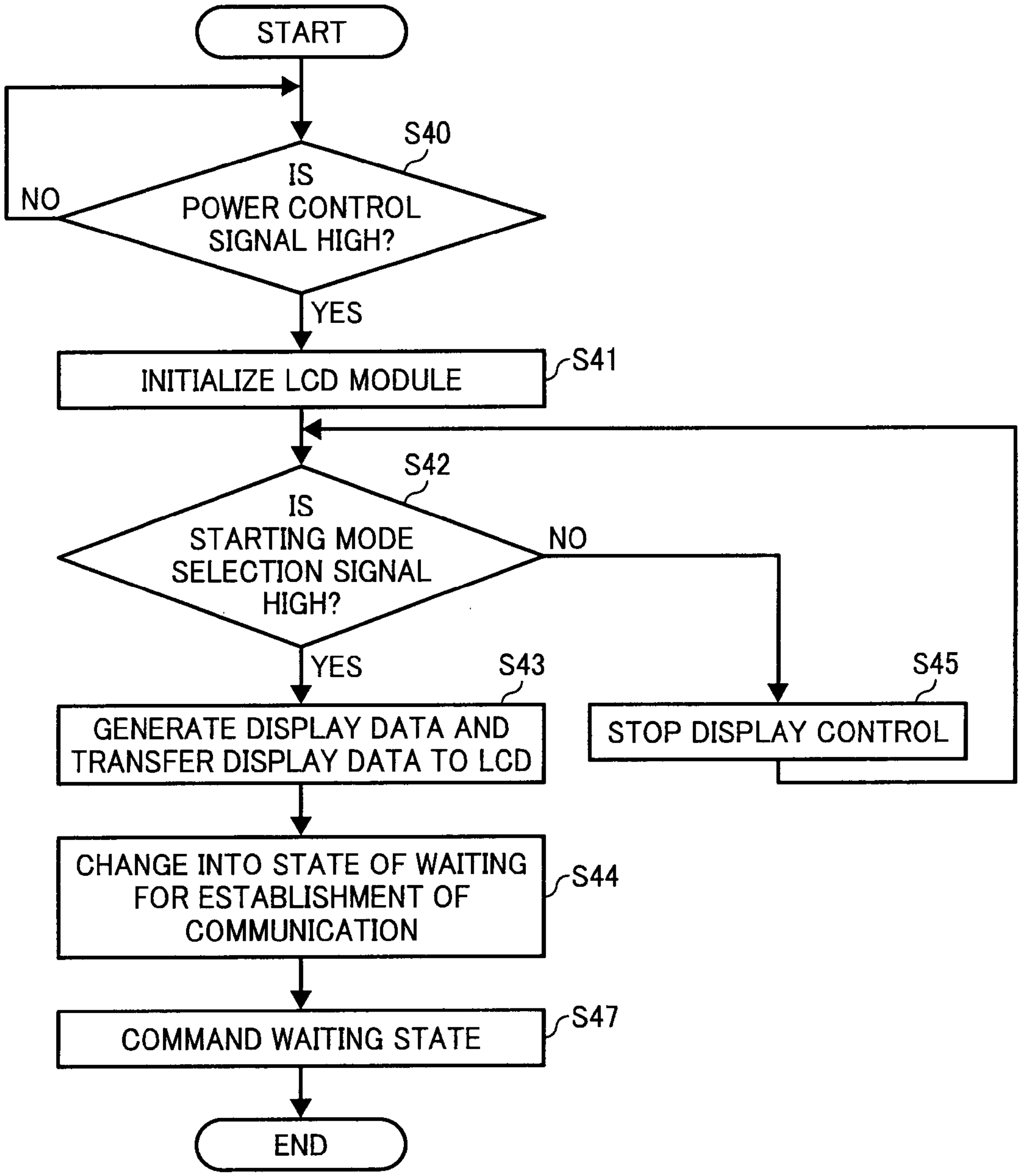
FIG. 12 is a flowchart of a procedure of processes of mode return from the energy-saving mode at the operation unit control system 11 according to a sixth embodiment of the present invention.

FIG. 12 is a flowchart of a procedure of processes of mode return from the energy-saving mode at the operation unit control system 11 according to the present embodiment. The CPU 40 of the operation unit control system 11, as in the above description with reference to FIGS. 5 to 8, carries out the processes of steps S40 to S42 at the time of return from the energy-saving mode to the regular operation mode. When the starting mode selection signal detected at step S42 is High, the procedure proceeds to the process of step S43, which is followed by steps S44 and S47 that are described referring to FIG. 8. When the starting mode selection signal detected at step S42 is Low, the CPU 40 stops display control at step S45, from which the procedure proceeds to step S42. This means that the CPU 40 monitors the starting mode selection signal when it is Low.

According to the above configuration, the necessariness/unnecessariness of information display on the LCD 45 can be determined through the starting mode selection signal that is detected right after detection of a High power control signal when the operation mode returns from the energy-saving mode to the regular operation mode. Then, the main system 10 is allowed to send out a command on the necessariness/unnecessariness of information display on the LCD 45 after establishment of communication between the operation unit control system 11 and the main system 10 via the communication control line 18. This command enables a determination on the necessariness/unnecessariness of information display on the LCD 45. In other words, the starting mode selection signal and the command sent from the main system 10 through the communication control line 18 are provided as two factors for determination by the operation unit control system 11 on the necessariness/unnecessariness of information display on the LCD 45. Since the starting mode selection signal can be output from any subsystem as well as the main system 10, the necessariness/unnecessariness of information display on the LCD 45 may be specified differently by the starting mode selection signal and the command. In such a configuration, for example, even when the CPU 40 of the operation unit control system 11 determines information display on the LCD 45 to be unnecessary based on the command from the main system 10 and stops display control, the CPU 40 constantly monitoring the starting mode selection signal may cancel the prior determination based on the starting mode selection signal corresponding to a display request from a subsystem to restart information display on the LCD 45. This configuration, therefore, enables detection of a display request from a subsystem other than the main system 10 in a real-time process, thus suppresses a post-startup time lag caused by a subsystem to the minimum to execute display control.

A seventh embodiment of the image forming apparatus will then be described. The same constituent units as described in the first embodiment will be denoted by the same reference numerals or omitted in the following description.

Figure 13:
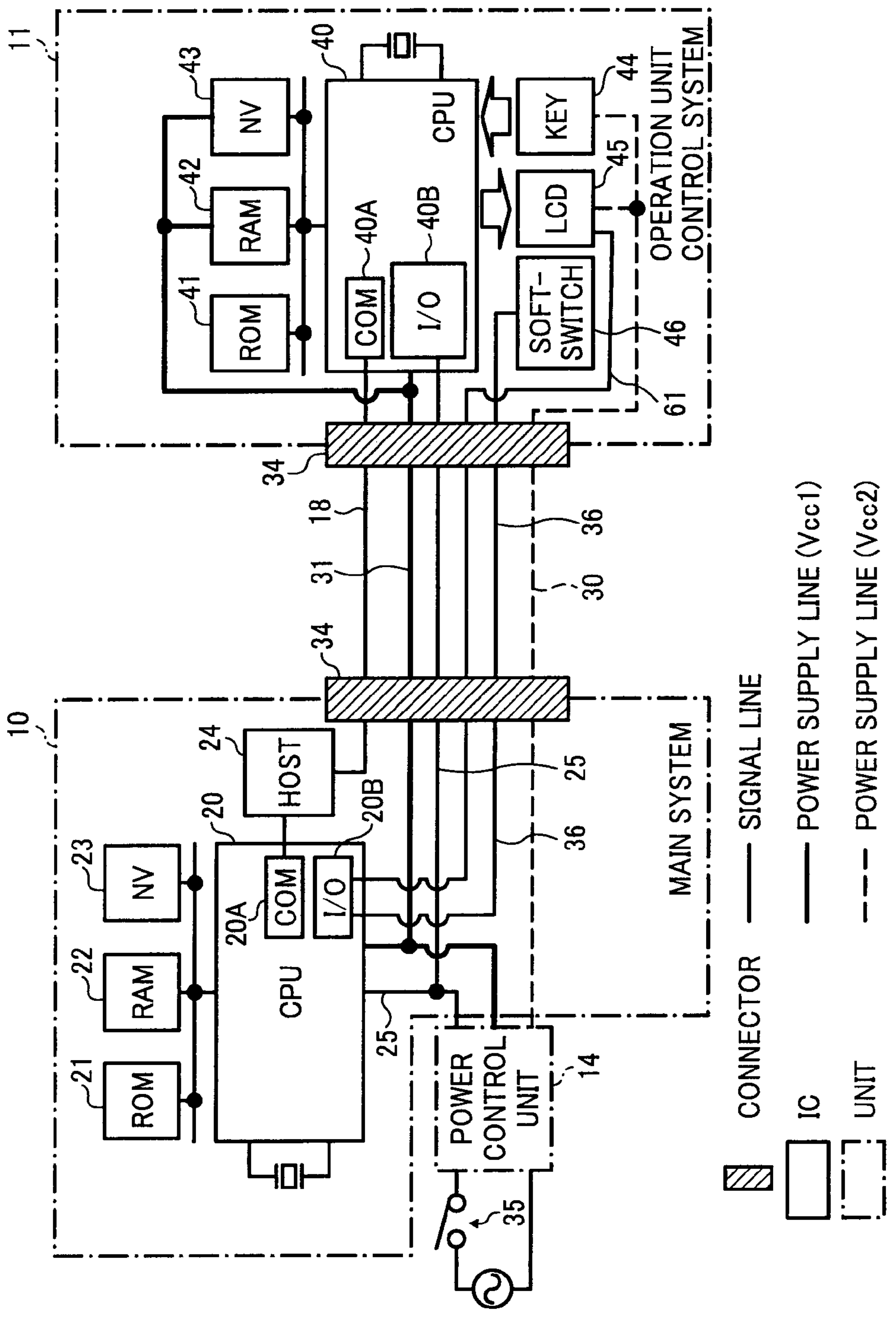
FIG. 13 is a block diagram of the internal configuration of the main system and the operation unit control system according to a seventh embodiment of the present invention.

FIG. 13 is a block diagram of the internal configuration of the main system 10 and the operation unit control system 11. In the present embodiment, the image forming apparatus does not have the signal line 32 of FIG. 1, but has a signal line 61 that connects the CPU 20 of the main system 10 to the LCD 45 of the operation unit control system 11. When the operation mode returns from the energy-saving mode to the regular operation mode, the CPU 20 determines on the necessariness/unnecessariness of information display on the LCD 45 according to a return condition in the same manner as described above. Then, the CPU 20 outputs a display control signal set to High via the signal line 61 when the result of the determination is positive while outputs a display control signal set to Low via the signal line 61 when the result of the determination is negative.

Figure 14:
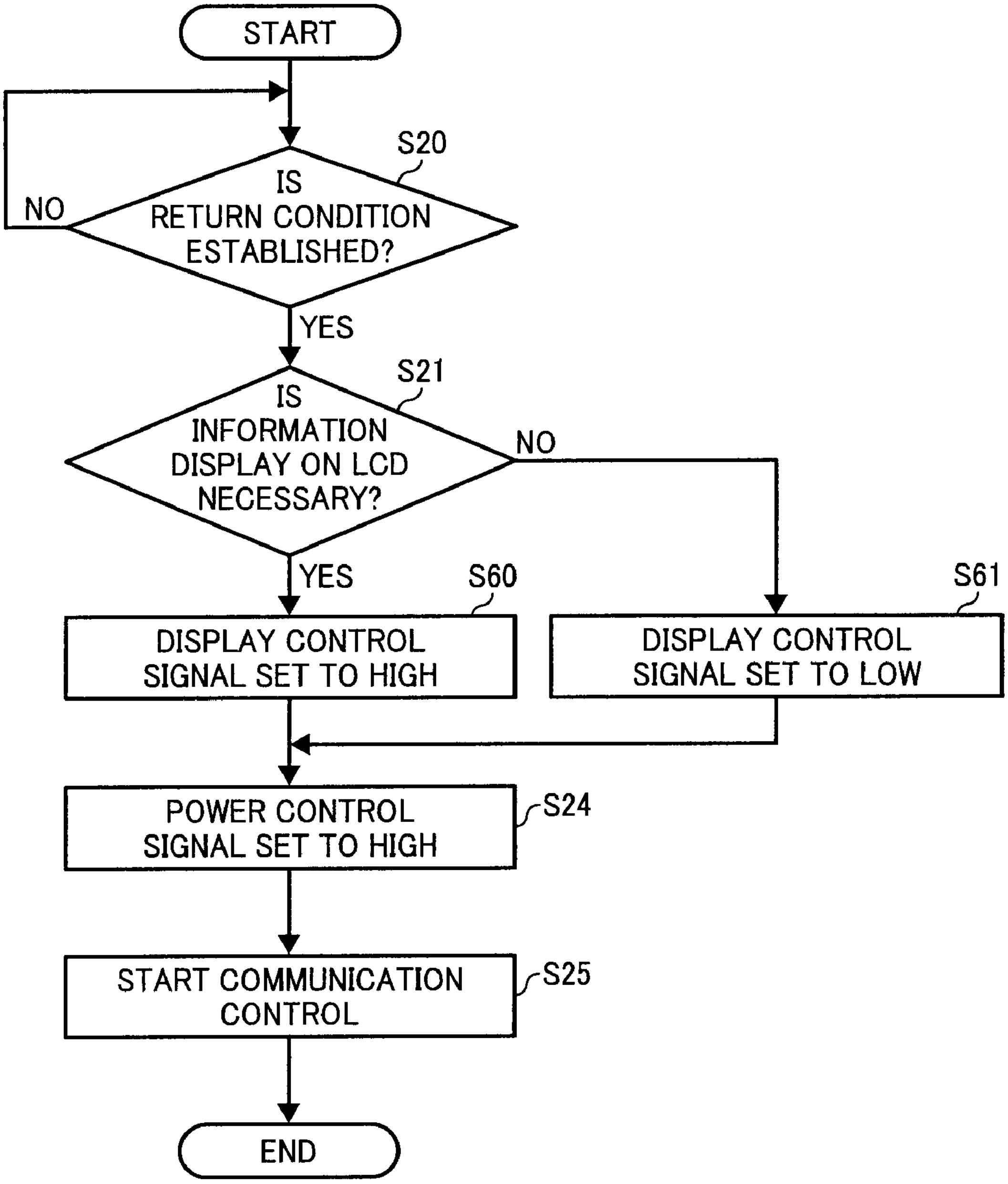
FIG. 14 is a flowchart of a procedure of processes of return from the energy-saving mode to a regular operation mode at the main system according to the seventh embodiment.

Processes of return from the energy-saving mode to the regular operation mode at the main system 10 will then be described. FIG. 14 is a flowchart of a procedure of processes of return from the energy-saving mode to the regular operation mode at the main system 10.

The CPU 20 of the main system 10 carries out the processes of steps S20 and S21 in the same procedure of processes of FIG. 4. When a determination result at step S21 is positive, the CPU 20 outputs a display control signal set to High via the signal line 61 (step S60). When a determination result at step S21 is negative, the CPU 20 outputs a display control signal set to Low via the signal line 61 (step S61). The processes following step S21 are the same as the processes in the first embodiment, and, therefore, are not explained further.

Figure 15:
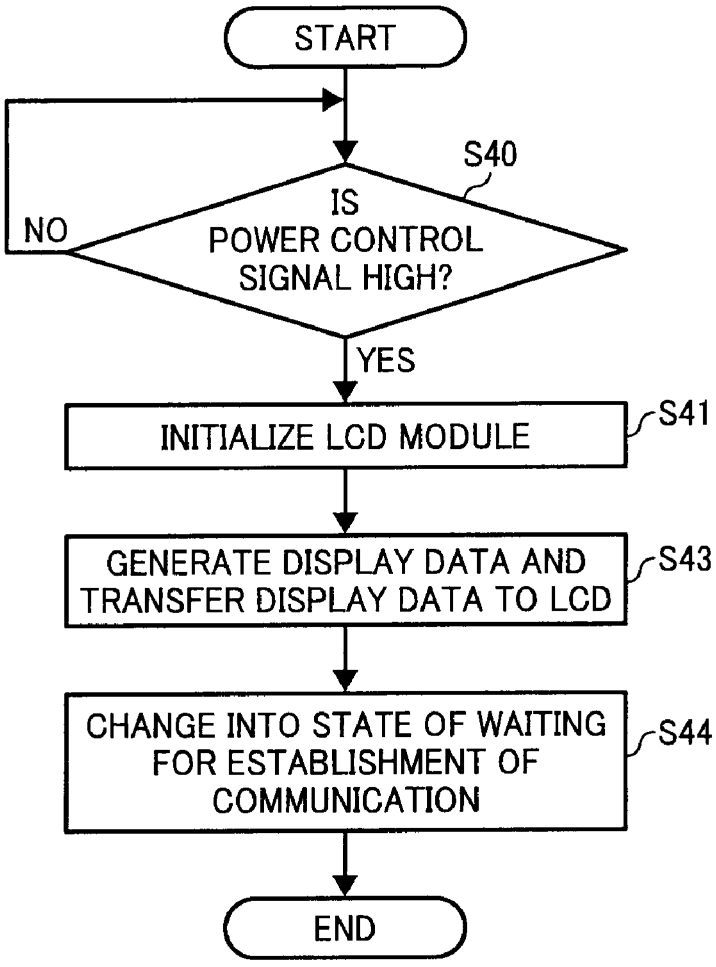
FIG. 15 is a flowchart of a procedure of processes of mode return from the energy-saving mode at the operation unit control system according to the seventh embodiment.

A procedure of processes of mode return from the energy-saving mode at the operation unit control system 11 in the present embodiment will then be described. FIG. 15 is a flowchart of a procedure of processes of mode return from the energy-saving mode at the operation unit control system 11. In the present embodiment, the CPU 40 of the operation unit control system 11 carries out the processes of steps S40 and S41 in the same procedure of processes of FIG. 5, after which the procedure proceeds to step S43. Specifically, the CPU 40 generates display data without determining on the necessariness/unnecessariness of information display on the LCD 45 and transmits the generated display data to the LCD 45. Meanwhile, the LCD 45 detects the state of the display control signal output from the main system 10 via the signal line 61, and displays information using the display data transmitted from the CPU 40 when the display control signal is High. If the display control signal is Low, the LCD 45 does not use the display data transmitted from the CPU 40, and, therefore, does not display information. The processes following step S43 are the same as the processes in the first embodiment.

As describe above, setting a display control signal to High enables the LCD 45 to display information, while setting the display control signal to Low disables the LCD 45 from displaying information. This saves the CPU 40 of the operation unit control system 11 from a need of determining on the necessariness/unnecessariness of information display on the LCD 45, and from a need of constantly monitoring a starting mode selection signal. Thus, software scale and control load at the operation unit control system 11 are reduced, which enables the achievement of a more inexpensive constitution.

The present invention is not limited to the above embodiments, but allows the following variants.

The image forming apparatus 1 may be given a configuration that is a combination of at least two or more configurations of the above first to seventh embodiments.

According to the embodiments of the present invention, display in a short time by the display unit and inhibition of unnecessary display by the display unit are achieved more effectively when the energy-saving mode returns to the regular operation mode.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:

a main system controlling an operation of the information processing apparatus; and a subsystem connected to and communicating with the main system via a communication control line to perform information processing functions, wherein the subsystem includes a first subsystem that controls information display on a display unit, wherein the main system includes a mode changeover unit that, according to a predetermined condition, changes a mode of the information processing apparatus to one of a regular operation mode in which given power is supplied to the main system and the subsystem, and an energy-saving mode in which power lower than power supplied in the regular operation mode is supplied to the main system and the subsystem;

a first signal output unit that when the mode changeover unit changes the mode of the information processing apparatus from the energy-saving mode to the regular operation mode, outputs a power control signal indicating the mode changeover of the information processing apparatus; and a second signal output unit that when the mode changeover unit changes the mode of the information processing apparatus from the energy-saving mode to the regular operation mode, determines necessariness of information display on the display unit and outputs a starting mode selection signal indicating a result of the determination, wherein the first subsystem includes an apparatus information obtaining unit that when the mode changeover unit changes the mode of the information processing apparatus from the regular operation mode to the energy-saving mode, obtains apparatus information on the information processing apparatus from the main system;

a first signal detecting unit that detects the power control signal output from the first signal output unit;

a second signal detecting unit that detects the starting mode selection signal output from the second signal output unit; and a display control unit that controls display of information on the display unit, the information containing the apparatus information obtained by the apparatus information obtaining unit, based on the power control signal detected by the first signal detecting unit and the starting mode selection signal detected by the second signal detecting unit.

2. The information processing apparatus according to claim 1, wherein when the power control signal indicates changeover from the energy-saving mode to the regular operation mode and when the starting mode selection signal indicates necessariness of information display on the display unit, the display control unit causes the display unit to display the information containing the apparatus information obtained by the apparatus information obtaining unit.

3. The information processing apparatus according to claim 1, wherein when the mode changeover unit changes the mode of the information processing apparatus from the energy-saving mode to the regular operation mode, the second signal output unit determines necessariness of information display on the display unit according to the predetermined condition and outputs the starting mode selection signal indicating a result of the determination.

4. The information processing apparatus according to claim 1, wherein the apparatus information obtaining unit includes a reception unit that when the mode changeover unit changes the mode of the information processing apparatus from the regular operation mode to the energy-saving mode, receives apparatus information on the information processing apparatus from the main system via the communication control line; and a memory unit that stores thereon the apparatus information received by the reception unit.

5. The information processing apparatus according to claim 1, further comprising a communication control unit cutting off communication between the main system and the subsystem via the communication control line when the mode changeover unit changes the mode of the information processing apparatus from the regular operation mode to the energy-saving mode, and resuming communication between the main system and the subsystem via the communication control line when the mode changeover unit changes the mode of the information processing apparatus from the energy-saving mode to the regular operation mode.

6. The information processing apparatus according to claim 1, wherein the first subsystem further includes a command receiving unit that receives a command from the main system via the communication control line, wherein when the mode changeover unit changes the mode of the information processing apparatus from the energy-saving mode to the regular operation mode and when the starting mode selection signal detected by the second signal detecting unit and a command transmitted from the main system via the communication control line and received by the command receiving unit indicate different instructions on information display on the display unit, the display control unit controls information display on the display unit using either the command that is received by the command receiving unit later than detection of the starting mode selection signal by the second signal detecting unit, or the starting mode selection signal that is detected by the second signal detecting unit later than reception of the command by the command receiving unit.

7. The information processing apparatus according to claim 1, wherein when communication between the main system and the first subsystem via the communication control line becomes possible after the changeover of the mode of the information processing apparatus from the energy-saving mode to the regular operation mode, the second signal detecting unit stops detecting the starting mode selection signal output from the second signal output unit.

8. The information processing apparatus according to claim 1, further comprising a third signal output unit outputting an equipment status signal used by the display control unit to determine a possibility of a change in the apparatus information when the mode changeover unit changes the mode of the information processing apparatus from the energy-saving mode to the regular operation mode, wherein when determining display of information on the display unit based on the power control signal detected by the first signal detecting unit and the starting mode selection signal detected by the second signal detecting unit, the display control unit determines that the apparatus information obtained by the apparatus information obtaining unit is to be contained in information displayed on the display unit based on the equipment status signal output from the third signal output unit, and causes the display unit to display the information according to a result of the determination.

9. The information processing apparatus according to claim 8, wherein the third signal output unit outputs the equipment status signal that is set to High when supply of predetermined power to the main system and the subsystem is cut off, wherein when determining display of information on the display unit based on the power control signal detected by the first signal detecting unit and the starting mode selection signal detected by the second signal detecting unit and when the equipment status signal output from the third signal output unit is High, the display control unit causes the display unit to display the information containing the apparatus information.

10. The information processing apparatus according to claim 1, wherein the subsystem includes a second subsystem that has a third signal output unit outputting the starting mode selection signal, wherein the second signal detecting unit detects at least either of the starting mode selection signal output from the second signal output unit and the starting mode selection signal output from the third signal output unit.

11. The information processing apparatus according to claim 1, wherein the first signal output unit further includes a first signal line for outputting the power control signal.

12. The information processing apparatus according to claim 1, wherein the second signal output unit further includes a second signal line for outputting the starting mode selection signal.

13. An information processing apparatus comprising:

a main system controlling an operation of the information processing apparatus; and a subsystem connected to and communicating with the main system via a communication control line to perform information processing functions, wherein the subsystem includes a first subsystem that controls information display on a display unit, wherein the main system includes a mode changeover unit that, according to a predetermined condition, changes a mode of the information processing apparatus to one of a regular operation mode in which a power control unit supplies given power to the main system and the subsystem, and an energy-saving mode in which the power control unit supplies power lower in potential than power supplied in the regular operation mode to the main system and the subsystem; and a first signal output unit that when the mode changeover unit changes the mode of the information processing apparatus from the energy-saving mode to the regular operation mode, determines necessariness of information display on the display unit and outputs a starting mode selection signal indicating a result of the determination, wherein the first subsystem includes an apparatus information obtaining unit that when the mode changeover unit changes the mode of the information processing apparatus from the regular operation mode to the energy-saving mode, obtains apparatus information on the information processing apparatus from the main system;

a power detecting unit that detects a potential of power supplied by the power control unit;

a first signal detecting unit that detects the starting mode selection signal output from the second signal output unit; and a display control unit that controls display of information on the display unit, the information containing the apparatus information obtained by the apparatus information obtaining unit, based on the potential detected by the power detecting unit and the starting mode selection signal detected by the second signal detecting unit.

14. The information processing apparatus according to claim 13, wherein the first signal output unit further includes a first signal line for outputting the starting mode selection signal.

15. An information processing apparatus comprising:

a main system controlling an operation of the information processing apparatus;

a subsystem connected to and communicating with the main system via a communication control line to perform information processing functions; and a display unit carrying out information display, wherein the subsystem includes a first subsystem that controls information display on the display unit, wherein the main system includes a mode changeover unit that, according to a predetermined condition, changes a mode of the information processing apparatus to one of a regular operation mode in which given power is supplied to the main system and the subsystem, and an energy-saving mode in which power lower than power supplied in the regular operation mode is supplied to the main system and the subsystem;

a first signal output unit that when the mode changeover unit changes the mode of the information processing apparatus from the energy-saving mode to the regular operation mode, outputs a power control signal indicating the mode changeover of the information processing apparatus; and a second signal output unit that when the mode changeover unit changes the mode of the information processing apparatus from the energy-saving mode to the regular operation mode, determines necessariness of information display on the display unit according to the predetermined condition and outputs a display control signal indicating a result of the determination, wherein the first subsystem includes an apparatus information obtaining unit when the mode changeover unit changes the mode of the information processing apparatus from the regular operation mode to the energy-saving mode, obtains apparatus information on the information processing apparatus from the main system;

a first signal detecting unit that detects the power control signal output from the first signal output unit; and a display control unit that transmits display information containing the apparatus information obtained by the apparatus information obtaining unit to the display unit based on the power control signal detected by the first signal detecting unit, wherein the display unit detects the display control signal output from the second signal output unit, and selectively carries out or does not carry out information display using the display information transmitted from the display control unit, based on the display control signal.

16. The information processing apparatus according to claim 15, wherein when the display control signal indicates necessariness of information display on the display unit, the display unit carries out information display using the display information transmitted from the display control unit.

17. The information processing apparatus according to claim 15, wherein when the display control signal indicates unnecessariness of information display on the display unit, the display unit does not carry out information display.

18. The information processing apparatus according to claim 15, wherein the first signal output unit further includes a first signal line for outputting the power control signal.

19. The information processing apparatus according to claim 15, wherein the second signal output unit further includes a second signal line for outputting the starting mode selection signal.

* * * * *